US010939154B2

(12) United States Patent
Sato et al.

(10) Patent No.: US 10,939,154 B2
(45) Date of Patent: Mar. 2, 2021

(54) ELECTRONIC COMPONENT CONTROL BY A BASIC PART USING A RECEIVED COMMAND FROM A SERVER

(71) Applicant: CambrianRobotics, Inc., Tokyo (JP)

(72) Inventors: Yuki Sato, Nishitokyo (JP); Kohei Kido, Tokyo (JP)

(73) Assignee: CAMBRIANROBOTICS, INC., Tokyo (JP)

( * ) Notice: Subject to any disclaimer, the term of this patent is extended or adjusted under 35 U.S.C. 154(b) by 169 days.

(21) Appl. No.: 16/134,965

(22) Filed: Sep. 19, 2018

(65) Prior Publication Data

US 2019/0297372 A1    Sep. 26, 2019

(30) Foreign Application Priority Data

Mar. 20, 2018 (JP) .............................. JP2018-053008

(51) Int. Cl.
*H04N 21/41* (2011.01)
*H04N 21/422* (2011.01)
*G06F 16/16* (2019.01)
*G06F 16/23* (2019.01)

(52) U.S. Cl.
CPC ....... *H04N 21/4126* (2013.01); *G06F 16/168* (2019.01); *G06F 16/2358* (2019.01); *H04N 21/42204* (2013.01)

(58) Field of Classification Search
CPC .......... H04N 21/4126; H04N 21/42204; G06F 16/168; G06F 16/2358
USPC ........................................................ 709/203
See application file for complete search history.

(56) References Cited

U.S. PATENT DOCUMENTS

| 9,472,112 | B2* | 10/2016 | Schweikardt | A63H 33/04 |
| 10,291,793 | B2* | 5/2019 | Kawano | G06F 21/44 |
| 10,860,193 | B2* | 12/2020 | Nakai | G06Q 10/087 |
| 2011/0016249 | A1* | 1/2011 | Nakabo | G11B 19/02 |
| | | | | 710/303 |
| 2016/0171880 | A1* | 6/2016 | Wu | H04W 84/12 |
| | | | | 398/106 |
| 2017/0155937 | A1* | 6/2017 | Zhang | H04L 67/42 |
| 2018/0046508 | A1* | 2/2018 | Chou | G06F 13/385 |

(Continued)

FOREIGN PATENT DOCUMENTS

JP    2018072726 A  *  5/2018

OTHER PUBLICATIONS

Pradeeka Seneviratne, Beginning BBC micro:bit, 1-256, Jan. 2018 (Year: 2018).*

(Continued)

*Primary Examiner* — David P Zarka
(74) *Attorney, Agent, or Firm* — HEA Law PLLC

(57) ABSTRACT

A user terminal accepts an edition of a program to have a control unit of a basic part perform electronic component control using a library stored in a library storage accessed from a plurality of user terminals in common. The user terminal transmits, to a server system, a command to have the control unit of the basic part perform the electronic component control in accordance with execution of the program. The server system receives a command transmitted from the user terminal, and transmits a command based on the received command to the basic part. The control unit of the basic part performs the electronic component control based on the command transmitted from the server system.

15 Claims, 24 Drawing Sheets

(56) References Cited

U.S. PATENT DOCUMENTS

| | | | | |
|---|---|---|---|---|
| 2018/0276097 A1* | 9/2018 | Glenny | ............... | G06F 11/0757 |
| 2018/0285084 A1* | 10/2018 | Mimlitch, III | ........... | G06F 8/447 |
| 2018/0331847 A1* | 11/2018 | Chen | ................... | H04L 12/2834 |
| 2020/0051461 A1* | 2/2020 | Ju | ........................ | G09B 23/186 |

OTHER PUBLICATIONS

Book Description, Beginning BBC micro:bit: A Practical Introduction to micro:bit Development, O'Reilly Media, Inc., 1-2, available at https://learning.oreilly.com/library/view/beginning-bbc-microbit/9781484233603/ (Year: 2020).*

Admin, How to Send Micro:bit Data to ThingSpeak IoT Platform, ELECFRASKS, Inc., 1-13, Jan. 2018, available at https://www.elecfreaks.com/store/blog/post/how-to-send-microbit-data-to-iot-platform.html (Year: 2018).*

CambrianRobotics, obniz—Cloud Connected Development Board, Kickstarter, 1-31, Dec. 17, 2019, available at https://www.kickstarter.com/projects/cambrianrobotics/obniz-api-managed-io (Year: 2019).*

Maker Faire, ObniZ hands-on, 1-2, Sep. 23, 2017, available at https://makerfaire.com/maker/entry/63417/ (Year: 2017).*

Microsoft Computer Dictionary 111 (5th ed. 2002) (Year: 2002).*

JP-2018072726—A machine English translation (Year: 2018).*

Wataru Kunino, "Super-Rush Manufacture! IoT circuit encyclopedia", Transistor Gijutsu,vol. 54, No. 3, CQ Publishing Co.,Ltd., Mar. 1, 2017, vol. 54, No. 3,pp. 97-101.

Atsushi Kobayashi, "Quick solution for system in need, Unix command, Java Script, Perl, Web API, Hacking executable by engineers",Software Design, No. 257, Gijutsu-Hyohron Co., Ltd., Mar. 18, 2012, No. 257, pp. 87-92.

Office Action dated Jan. 8, 2019, for corresponding JP Patent Application No. 2018-208745. (Concise explanation of relevance for NPL 1 and 2.).

1. Satoshi Kimura, "Chapter 3: Essential to Hard controls, Mechanism Capableof Remote I/O Using Web API, My HTML Server & Application Software,Interface", vol. 39, Eighth issue, Japan, CQ Publishing Co., Ltd., Aug. 1, 2013, vol. 39, Eighth issue, pp. 37-47 Cited in the Office Action dated Aug. 14, 2018 for corresponding JP patent application No. JP2018-053008.

Partial Translation of the Office Action dated Aug. 14, 2018 for corresponding JP patent application No. JP2018-053008.

"Microbit" : http://microbit.org/ja/guide/quick/ Cited in "Background Art Column" of the specification in line 21, p. 1.

* cited by examiner

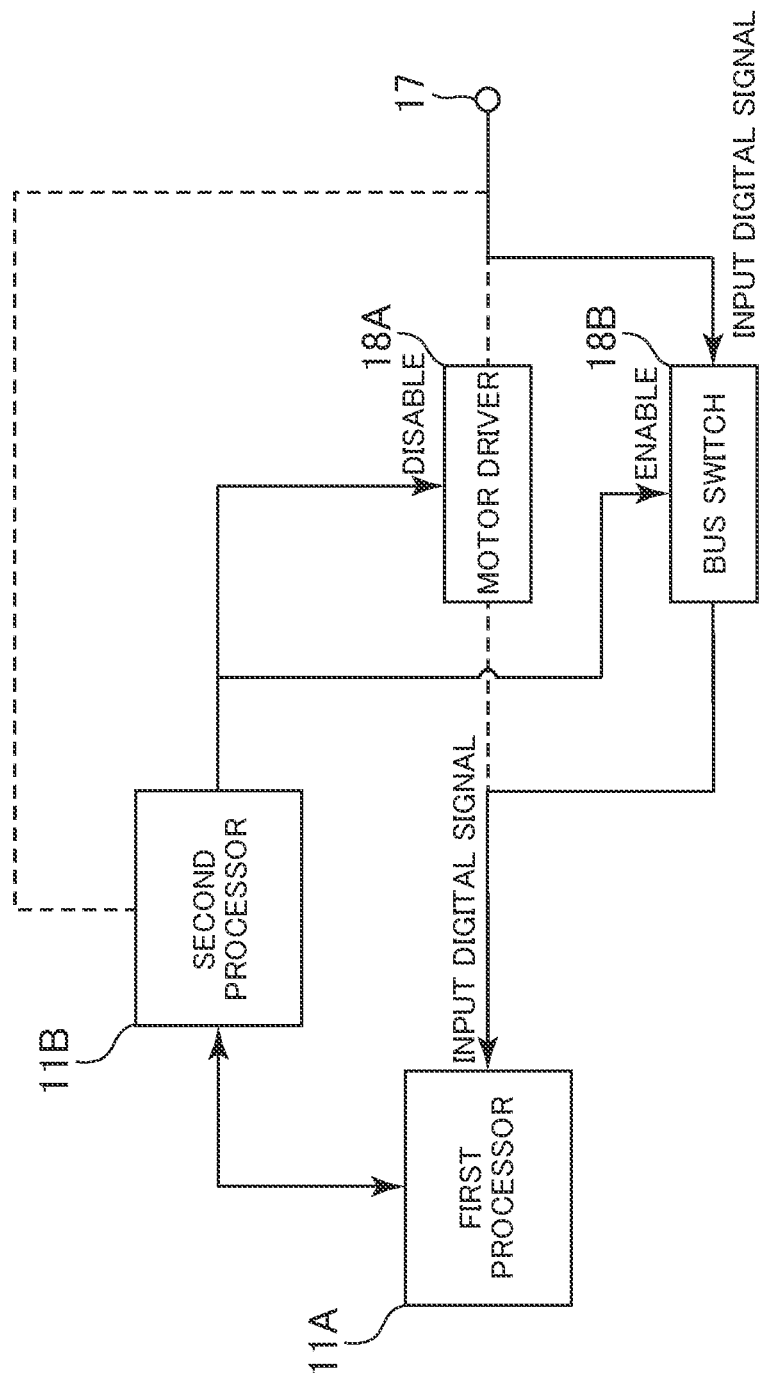

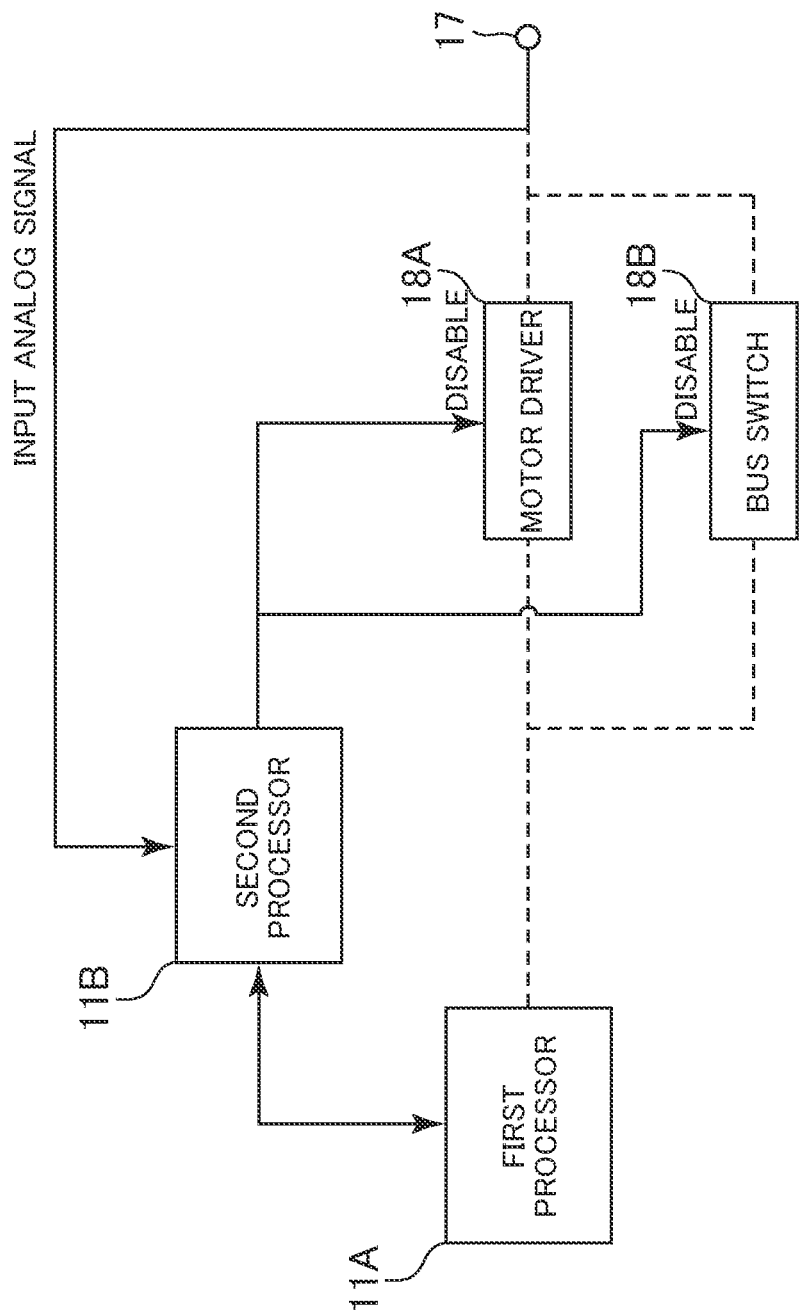

FIG.8

| ID | PROGRAM DATA |
|---|---|
| 0000-0000 | ------- |
| 0000-0001 | ------- |
| ... | ... | ously
ELECTRONIC COMPONENT CONTROL BY A BASIC PART USING A RECEIVED COMMAND FROM A SERVER

CROSS-REFERENCE TO RELATED APPLICATION

The present application claims priority from Japanese application JP 2018-053008 filed on Mar. 20, 2018, the content of which is hereby incorporated by reference into this application.

BACKGROUND OF THE INVENTION

1. Field of the Invention

One or more embodiments of the present invention relate to a control system, a control method, and a basic part.

2. Description of the Related Art

A basic part to include a terminal to which an electronic component can be connected, a control unit which performs electronic component control with respect to an electronic component connected to a terminal, and a storage unit, and to be a basis of electronic works is known (for example, "microbit": microbit.org/ja/guide/quick/). A user connects various types of electronic components to the terminal of the basic part, creates a program to perform electronic component control with respect to an electronic component connected to the terminal, and has the control unit execute the program, and thus the user can perform electronic works for realizing a desired function.

SUMMARY OF THE INVENTION

Conventionally, as to the basic part as described above, in order to have the control unit of the basic part execute the program that the user created, it is necessary to write the program into the storage unit on the basic part. Therefore, it was hard to execute the program for some user.

The present invention has been made in view of the above problem, and the object thereof is to provide a control system, a control method, and a basic part which can have the control unit of the basic part perform the electronic component control as to the electronic component connected to the terminal of the basic part, with no necessity of writing the program to be executed by the control unit of the basic part into the storage unit on the basic part.

In order to solve the problem as described above, a control system according to one aspect of the present invention includes: a basic part to which one or more electronic components can be connected, the basic part including: a terminal to which an electronic component can be connected; a communication unit; and a control unit which performs electronic component control with respect to the electronic component connected to the terminal; a server system; a user terminal; and a library storage which is accessed from a plurality of user terminals in common and stores a library of an API (an application programing interface) to have the control unit of the basic part perform the electronic component control. The user terminal is configured to: acquire a library stored in the library storage; accept an input of a program to have the control unit of the basic part perform the electronic component control using the library; execute the program based on the library; and transmit, to the server system, a command to have the control unit of the basic part perform the electronic component control in accordance with execution of the program, the server system is configured to receive the command transmitted from the user terminal, and transmit a command based on the received command to the basic part, the communication unit of the basic part receives the command transmitted from the server system, and the control unit of the basic part performs the electronic component control based on the command received by the communication unit.

A control method according to one aspect of the present invention to control a basic part to which one or more electronic components can be connected, the basic part including: a terminal to which an electronic component can be connected; a communication unit; and a control unit which executes electronic component control with respect to the electronic component connected to the terminal, the method includes: acquiring, by a user terminal, a library of an API (an application programming interface) to have the control unit of the basic part perform the electronic component control, the library being stored in a library storage which is accessed from a plurality of user terminals in common; accepting, by the user terminal, an edition of a program to have the control unit of the basic part perform the electronic component control using the library; executing, by the user terminal, the program based on the library; transmitting, by the user terminal, to a server system, a command to have the control unit of the basic part perform the electronic component control in response to execution of the program; receiving, by the server system, the command transmitted from the user terminal, and transmitting, by the server system, a command based on the received command to the basic part; receiving, by the communication unit of the basic part, the command transmitted from the server system; and performing, by the control unit of the basic part, the electronic component control based on the command received by the communication unit.

A basic part according to one aspect of the present invention includes: a terminal to which an electronic component can be connected; a control unit which performs control with respect to the electronic component connected to the terminal; and a communication unit to communicate with a server system. The communication unit receives a command transmitted from the server system, the command being based on a command transmitted from a user terminal to the server system in accordance with execution of a program edited on the user terminal, and the control unit performs control with respect to the electronic component connected to the terminal based on the command received by the communication unit.

BRIEF DESCRIPTION OF THE DRAWINGS

FIG. 4C is a diagram for explaining an example of control with respect to the input/output unit.

FIG. 4D is a diagram for explaining an example of control with respect to the input/output unit.

FIG. 8 is a diagram which shows an example of contents which a database stores.

DETAILED DESCRIPTION OF THE INVENTION

An example of an embodiment of the present invention is described with reference to the accompanying drawings.

Figure 1:
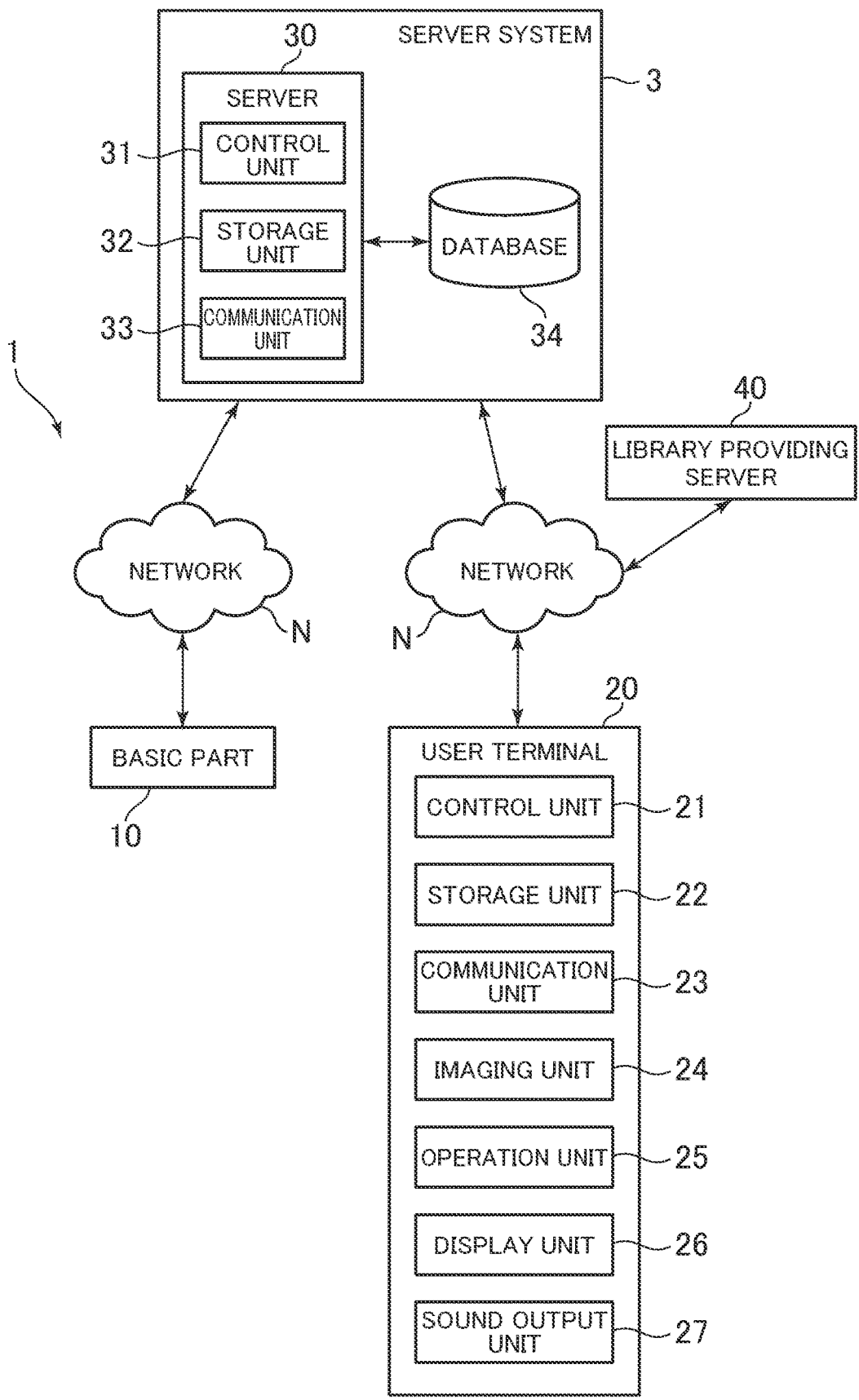
FIG. 1 is a diagram which shows an overall configuration of a control system according to an embodiment of the present invention.

[1. Overall Configuration of the System] FIG. 1 shows an overall configuration of a control system according to an embodiment of the present invention. As shown in FIG. 1, a control system 1 according to the embodiment includes a basic part 10, a user terminal 20, a server system 3, and a library providing server 40.

The basic part 10 is a part which constitutes a basis of electronic works. By connecting an electronic component to the basic part 10, and creating and executing a program, a user can control the electronic component connected to the basic part 10. Thus, a thing which has a desired function can be created. Details of the basic part 10 will be described later (see FIGS. 2 and 3).

A user terminal 20 is a computer which the user uses to control the basic part 10. For example, the user terminal 20 is, for example, a smart, phone, a tablet computer, a laptop computer, a desktop computer, or the like.

As shown in FIG. 1, the user terminal 20 includes a control unit 21, a storage unit 22, a communication unit 23, an imaging unit 24, an operation unit 25, a display unit 26, and a sound output unit 27. The control unit 21 includes at least one processor, and executes processing according to a program stored in a storage unit 22. The storage unit 22 includes a main memory unit (e.g., a RAM) and an auxiliary storage unit (e.g., a non-volatile semiconductor memory, a hard disk drive, or a solid state drive), and stores a program and data. The communication unit 23 is for performing data communication with another device via a network N including the internet or the like.

The imaging unit 24 is an imaging element such as CCD. The operation unit 25 is a unit with which the user can perform various types of operations. The display unit 26 is for displaying various types of screens, and is, for example, a liquid crystal display, an organic EL display, or the like. In FIG. 1, the operation unit 25 and the display unit 26 are separated, but they may be formed integrally as a touch panel. It is not necessary to form the operation unit 25 and the display unit 26 integrally as a touch panel, and the operation unit 25 may be provided separately from the display unit 26, as a keyboard, a mouse, a touch pad (a track pad), a lever (a stick), or the like. The sound output unit 27 is a unit for outputting sounds, and is, for example, a speaker, a headphone, or the like.

A server system 3 includes one or more servers 30 and one or more databases 34. A server 30 is a server computer. As shown in FIG. 1, the server 30 includes a control unit 31, a storage unit 32, and a communication unit 33. The control unit 31, the storage unit 32, and the communication unit 33 are the same as the control unit 21, the storage unit 22, and the communication unit 23. The server 30 can access a database 34. The database 34 may be constructed in a server computer other than the server 30, and may be constructed in a server 30.

A program and data is supplied to the user terminal 20 or the server 30 via the network N from a distant place, and is stored in the storage unit 22 or the storage unit 32. A component (e.g., an optical disk drive, a memory card slot, or the like) to read a program and data stored in an information storage medium (e.g., an optical disk, a memory card, or the like) may be provided in the user terminal 20 or the server 30. And, the program and data may be supplied to the user terminal 20 or the server 30 via the information storage medium.

In FIG. 1, although only one basic part 10 is shown, actually there are a plurality of parts 10. Similarly, in FIG. 1, although only one user terminal 20 is shown, actually there are a plurality of user terminals 20.

The server system 3 is located on an external network outside a network to which the basic part 10 or the user terminal 20 is connected. The respective basic parts 10 can communicate with the common server system 3 via the network N including the internet or the like. Further, the respective user terminals 20 can communicate with the common server system 3 via the network N including the internet or the like.

Further, in FIG. 1, although only one server 30 is shown, actually the server system 3 may include a plurality of servers 30. For example, it may be configured that when a number of connection to the main server 30 (an access number) gets more than a threshold value, a connection to a sub server 30 is made.

A library providing server 40 is a server computer storing a library of an API (an application program interface) which makes it easier to create a program for controlling the basic part 10 from the user terminal 20 via the network N and the server system 3.

For example, the library of the API to communicatively connect the user terminal 20 to the server system 3, and the API to transmit a command for controlling the basic part 10 from the user terminal 20 is stored in the library providing server 40. The library is created by the provider of the basic part 10 and are registered in the library providing server 40.

In the present embodiment, it is configured that the user terminal 20 is communicatively connected to the server system 3 via WebSocket, and the library of the API for the communication-connection via WebSocket or the like is registered in the library providing server 40.

The library providing server 40 is located on an external network outside a network to which the user terminal 20 is connected. The respective user terminals 20 can communicate with the common library providing server 40 via the network N. In other words, the library providing server 40 can provide the respective user terminals 20 with a common library. The library providing server 40 may be implemented by the server 30 which is inside the server system 3.

[2. Configuration of Basic Part] FIG. 2 is a diagram which shows an example of an external appearance of the basic part 10, and FIG. 3 shows an example of a hardware configuration of the basic part 10.

Figure 2:
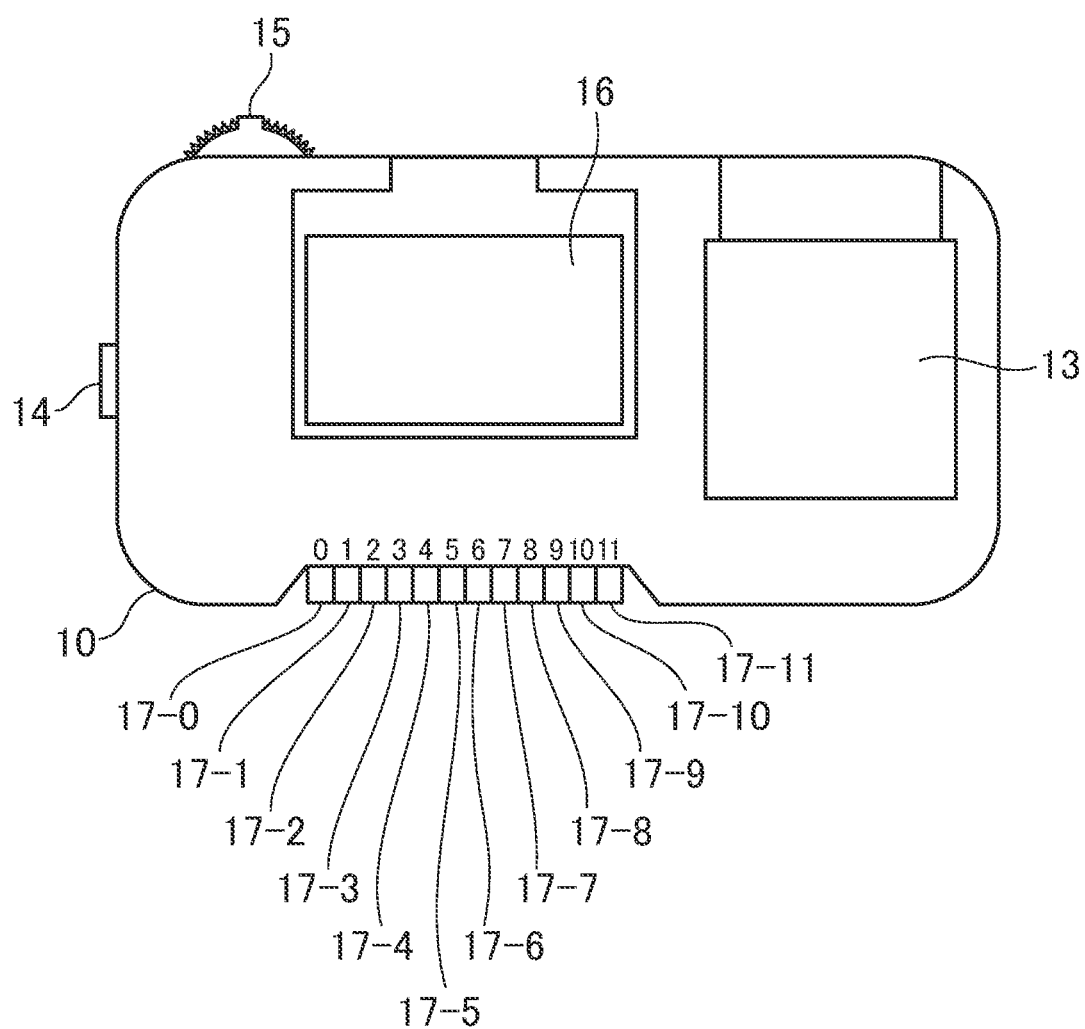
FIG. 2 is a diagram which shows an example of an external appearance of a basic part.
Figure 3:
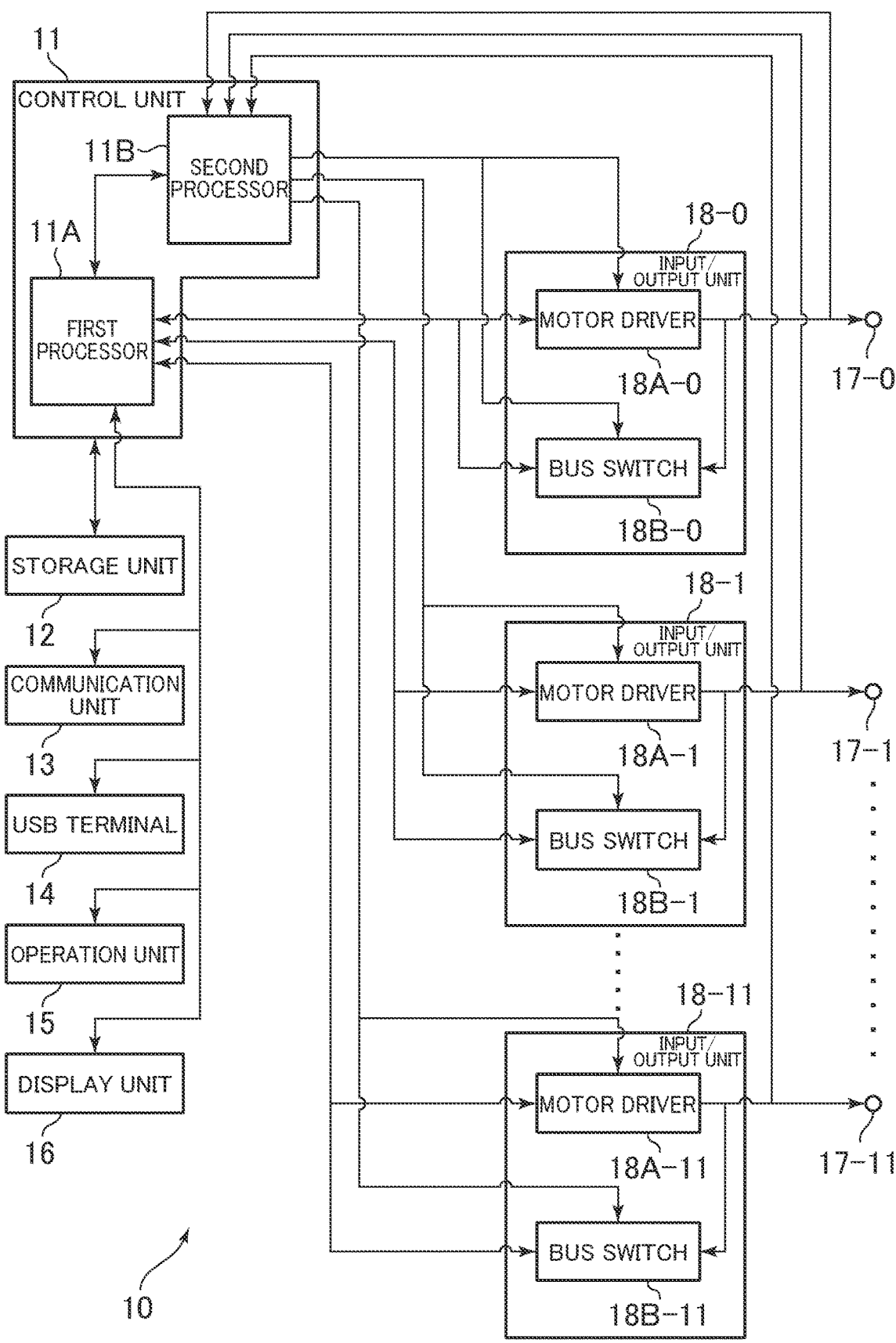
FIG. 3 is a diagram which shows an example of a hardware configuration of the basic part.

[2-1] FIG. 2 shows a top view of the front side of the basic part 10. The basic part 10 has a configuration where various types of chips, a display, and the like are attached onto a small substrate. As shown in FIGS. 2 and 3, the basic part 10 includes a control unit 11, a storage unit 12, a communication unit 13, a USB terminal 14, an operation unit 15, and a display unit 16. The control unit 11 is connected to the storage unit 12, the communication unit 13, the USB terminal 14, the operation unit 15, and a display unit 16 by, for example, an I2C (Inter-Integrated Circuit) bus.

The control unit 11 includes a first processor 11A and a second processor 11B. The first processor 11A and the second processor 11B are connected by, for example, the I2C bus, and can communicate with each other. In the example shown in FIG. 2, the first processor 11A and the second processor 11B are not provided on the front side of the basic part 10, but are provided on the back side.

The storage unit 12 includes a main memory unit (e.g., RAM) and an auxiliary storage unit (e.g., a non-volatile semiconductor memory, a hard disk drive, and a solid state drive), and stores a program and data. In the example shown in FIG. 2, a component which corresponds to the storage unit 12 is not provided on the front side of the basic part 10, but is provided on the back side.

The communication unit 13 is provided for data communication with another device via the network N including the internet or the like. For example, the communication unit 13 is provided for communication in accordance with the wireless LAN communication standard. Therefore, via the communication unit 13, the basic part 10 performs wireless communication connection with a wireless LAN access point which is separately provided. The communication unit 13 may be a unit which performs communication in accordance with a communication standard other than the wireless LAN communication standard. For example, the communication unit 13 may be a unit for performing communication via a mobile phone network or a wired LAN. In the example shown in FIG. 2, a component which corresponds to the communication unit 13 is provided on the front side of the basic part 10.

The USB terminal 14 is a terminal which is in accordance with the USB interface standard. In the present embodiment, the USB terminal 14 is used for supplying electric power to drive the basic part 10. That is, the USB terminal 14 is connected to an electric power source via a USB cable. In the example shown in FIG. 2, the USB terminal 14 is provided on the lateral surface on the left side of the basic part 10. The method to supply electric power to the basic part 10 is not limited to a method to use the USB terminal 14, and another method may be adopted.

The operation unit 15 is provided for a user to perform various types of operations. As will be described later, the operation unit 15 is used when performing a configuration of the basic part 10 for the wireless LAN (a configuration of an SSID, a password, or the like). In the example shown in FIG. 2, a dial type operation unit 15 is provided on the lateral surface on the rear side of the basic part 10.

The display unit 16 is for displaying various types of information about the basic part 10, and is, for example, an organic EL display, a liquid crystal display, or the like. In the example shown in FIG. 2, the display unit 16 is provided on the front side of the basic part 10.

Further, as shown in FIGS. 2 and 3, the basic part 10 includes twelve terminals, namely, terminals 17-0, 17-1, 17-2, 17-3, 17-4, 17-5, 17-6, 17-7, 17-8, 17-9, 17-10, and 17-11.

The terminals 17-0 to 17-11 are general-purpose terminals for connecting various types of electronic components to the basic part 10. For example, an LED, a servomotor, a DC motor, a volume (a variable resistance), a button, an acceleration sensor, a temperature sensor, or the like can be connected to the terminals 17-0 to 17-11. Naturally, an electronic component other than those can be connected to the terminals 17-0 to 17-11. In the example shown in FIG. 2, the terminals 17-0 to 17-11 are provided on the lateral surface on the near side of the basic part 10. In the present embodiment, twelve terminals, namely, the terminals 17-0 to 17-11 are provided, the number of those terminals can be 11 or less, and also can be 13 or more. Below, the respective terminals 17-0 to 17-11 might be collectively referred to as the "terminal 17".

As will be described later, a user inputs a program into the user terminal 20, and can control an electronic component connected to the basic part 10 by executing the program on the user terminal 20. For example, by having the user terminal 20 execute the program, the user can have an LED connected to the terminal 17 emit light or rotate a servomotor connected to the terminal 17. Further, for example, by having the user terminal 20 execute the program, the user can, when a button connected to the terminal 17 of the basic part 10 is pressed, have an LED connected to another terminal 17 of the basic part 10 emit light or have an LED connected to a terminal 17 of another basic part 10 emit light.

Further, as shown in FIG. 3, the basic part 10 includes input/output units 18-0, 18-1, . . . , and 18-11 which respectively corresponds to the terminals 17-0 to 17-11.

The input/output unit 18-0 is connected between the control unit 11 and the terminal 17-0. As shown in FIG. 3, the input/output unit 18-0 includes a motor driver 18A-0 and a bus switch 18B-0. As shown in FIG. 3, the first processor 11A is connected to both of the motor driver 18A-0 and the bus switch 18B-0. Similarly, the second processor 11B is also connected to both of the motor driver 18A-0 and the bus switch 18B-0. Further, the second processor 11B is connected to the terminal 17-0, as well. An electronic fuse (not shown) is connected to the motor driver 18A-0.

In the same manner, the input/output unit 18-1 is connected between the control unit 11 and the terminal 17-1. As shown in FIG. 3, the input/output unit 18-1 includes a motor driver 18A-1 and a bus switch 18B-1. The input/output unit 18-1, the motor driver 18A-1, and the bus switch 18B-1 have configurations the same as those of the input/output unit 18-0, the motor driver 18A-0, and the bus switch 18B-0.

Further, the input/output unit 18-11 is connected between the control unit 11 and the terminal 17-11. As shown in FIG. 3, the input/output unit 18-11 includes a motor driver 18A-11 and a bus switch 18B-11. The input/output unit 18-11, the motor driver 18A-11, and the bus switch 18B-11 also have configurations the same as those of the input/output unit 18-0, the motor driver 18A-0, and the bus switch 18B-0.

Although not shown in FIG. 3, an input/output unit the same as the input/output unit 18-0 is provided for each of the terminals 17-2 to 17-10.

Below, the respective input/output units 18-0, 18-1, ..., 18-11 might be collectively referred to as the "input/output unit 18". Similarly, the respective motor drivers 18A-0, 18A-1, ..., 18A-11 might be collectively referred to as the "motor driver 18A", and the respective bus switches 18B-0, 18B-1, ..., 18B-11 might be collectively referred to as the "bus switch 18B".

[2-2] The control unit 11 (the first processor 11A and the second processor 11B) controls the input/output unit 18 (the motor driver 18A and the bus switch 18B), depending on a type of an electronic component connected to the terminal 17. FIGS. 4A to 4D are diagrams for explaining examples of controls with respect to the input/output unit 18.

Figure 4A:
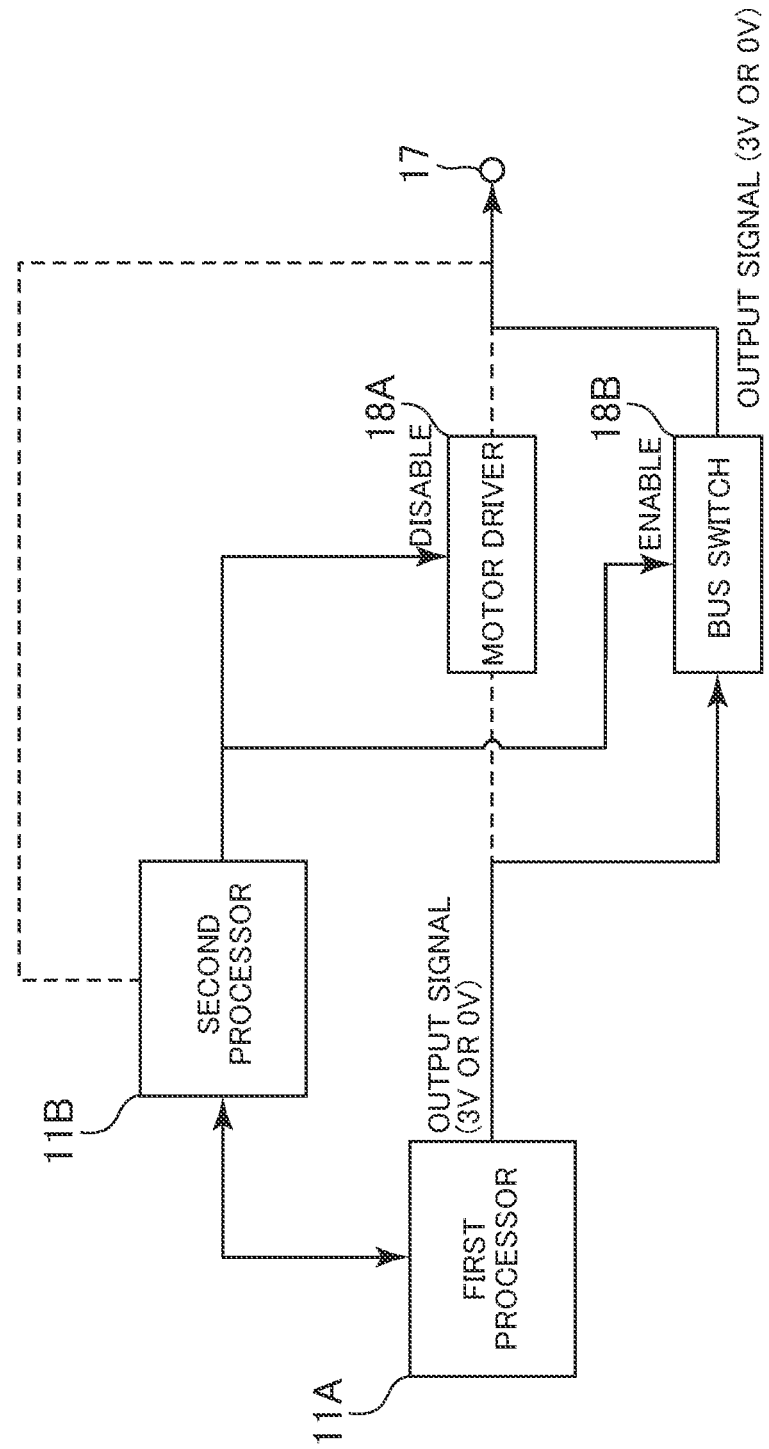
FIG. 4A is a diagram for explaining an example of control with respect to an input/output unit.

FIG. 4A shows control with respect to the input/output unit 18 in the case where an electronic component which requires a supply of a signal of 3V is connected to the terminal 17. In this case, the second processor 11B sets the motor driver 18A to "Disable", and sets the bus switch 18B to "Enable". As a result, the first processor 11A outputs the signal of 3V or 0V to the terminal 17 via the bus switch 18.

Figure 4B:
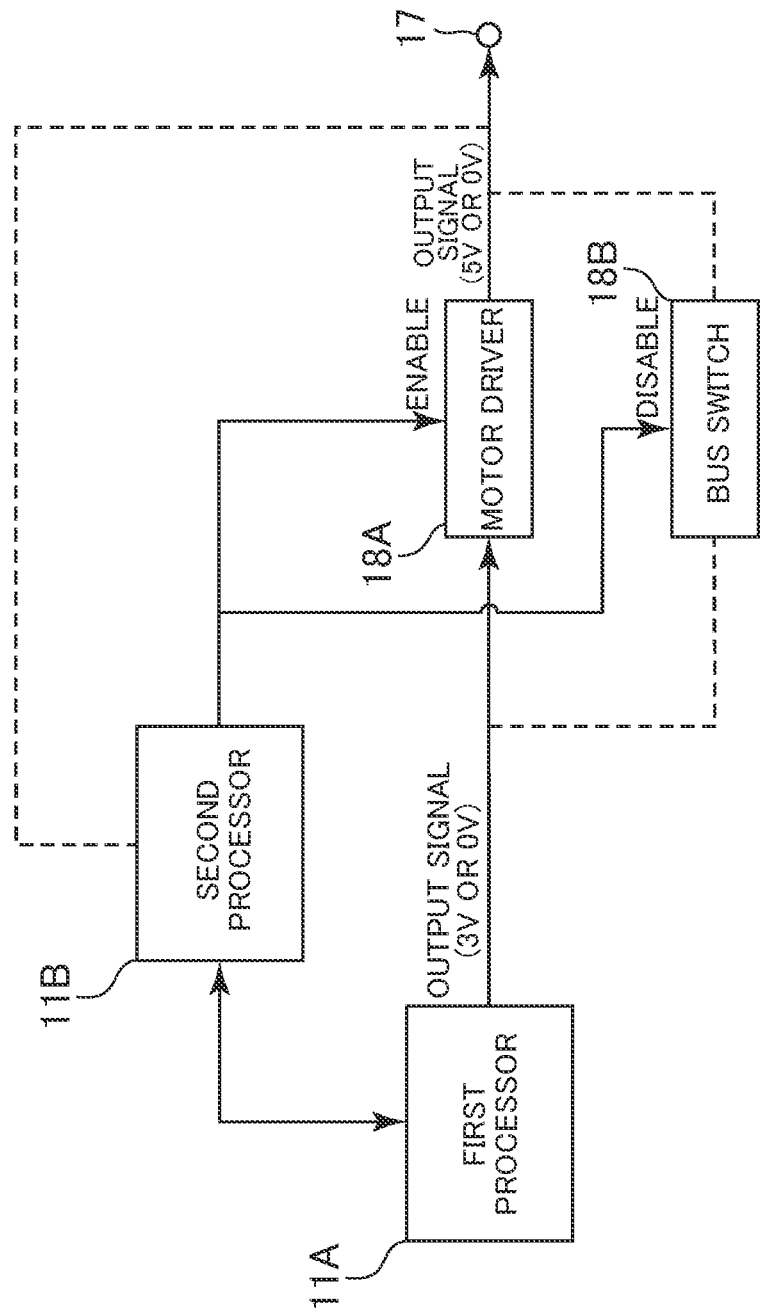
FIG. 4B is a diagram for explaining an example of control with respect to the input/output unit.

FIG. 4B shows control with respect to the input/output unit 18 in the case where an electronic component which requires a supply of a large signal or an electric component with a high load is connected to the terminal 17. FIG. 4B shows control with respect to the input/output unit 18 in the case where an electronic component which requires a supply of a signal of 5V (greater than the one in the case of FIG. 4A) is connected to the terminal 17. In this case, the second processor 11B sets the motor driver 18A to "Enable", and sets the bus switch 18B to "Disable". As a result, the first processor 11A outputs the signal of 5V or 0V to the terminal 17 via the motor driver 18A. In the case where the first processor 11A inputs a signal of 3V to the motor driver 18A, the motor driver 18A outputs a signal of 5V to the terminal 17.

FIG. 4C shows control with respect to the input/output unit 18 in the case where an electronic component which inputs a digital signal of 3V or 5V to the basic part 10 is connected to the terminal 17. In this case, the second processor 11B sets the motor driver 18A to "Disable", and sets the bus switch 18B to "Enable". As a result, the digital signal input from the terminal 17 is supplied to the first processor 11A via the bus switch 18B.

FIG. 4D shows control with respect to the input/output unit 18 in the case where an electronic component which inputs an analog signal to the basic part 10 is connected to the terminal 17. In this case, the second processor 11B sets the motor driver 18A to "Disable", and also sets the bus switch 18B to "Disable". As a result, the analog signal input from the terminal 17 is input to the second processor 11B via an A/D conversion circuit (not shown). Then, the input signal is supplied from the second processor 11B to the first processor 11A.

By having the configurations as above, various types of components can be connected to the terminal 17 of the basic part 10. For example, various types of components which require different voltages or different currents, or various types of components which have different loads can be connected to the terminal 17 of the basic part 10. Specifically, both of the motor driver 18A and the bus switch 18B are connected to the respective terminals 17, and they are switched depending on an electronic component connected to the terminal 17. That is, in the case where an electronic component which requires a large voltage (or a large current) or an electronic component which has a high load is connected to the terminal 17, the control is performed via the motor driver 18A, and in the case where an electronic component which requires a small voltage (or a small current) or an electronic component which has a low load is connected to the terminal 17, the control is performed via the bus switch 18B. Further, either an electronic component which inputs a digital signal to the basic part 10 or an electronic component which inputs an analog signal to the basic part 10 can be connected to the terminal 17.

[2-3] As has been described above, the basic part 10 includes two processors, namely, the first processor 11A and the second processor 11B. The first processor 11A and the second processor 11B mutually monitor their state and input/output. FIGS. 5A to 5D are diagrams to explain monitoring using two processors, the first processor 11A and the second processor 11B.

Figure 5A:
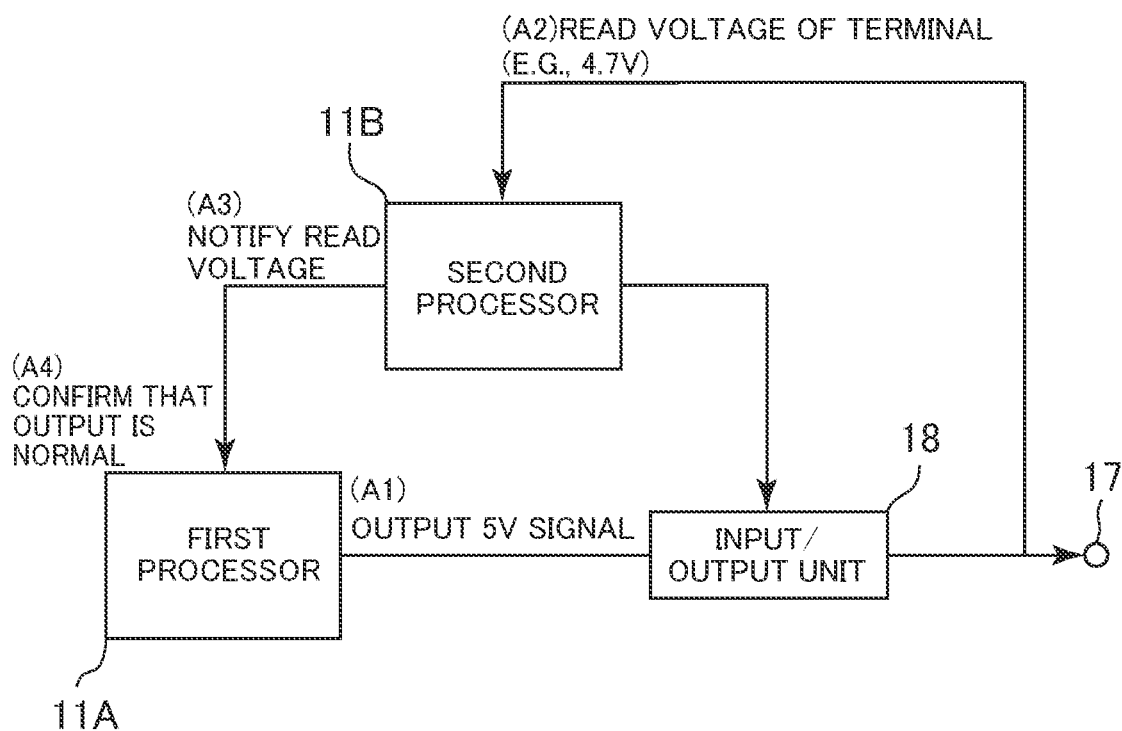
FIG. 5A is a diagram to explain monitoring using two processors.

FIG. 5A shows an example of the case where the operation is normal. In the example shown in FIG. 5A, the first processor 11A outputs a signal of 5V to the terminal 17 (A1). The second processor 11B is configured to be able to read the voltage of the terminal 17 in an analog value (A2), and the second processor 11B notifies the first processor 11A of the read voltage value (e.g., 4.7V) (A3). Then, the first processor 11A determines that the output to the terminal 17 is normally performed, since the voltage value notified from the second processor 11B is in a predetermined normal range.

Figure 5B:
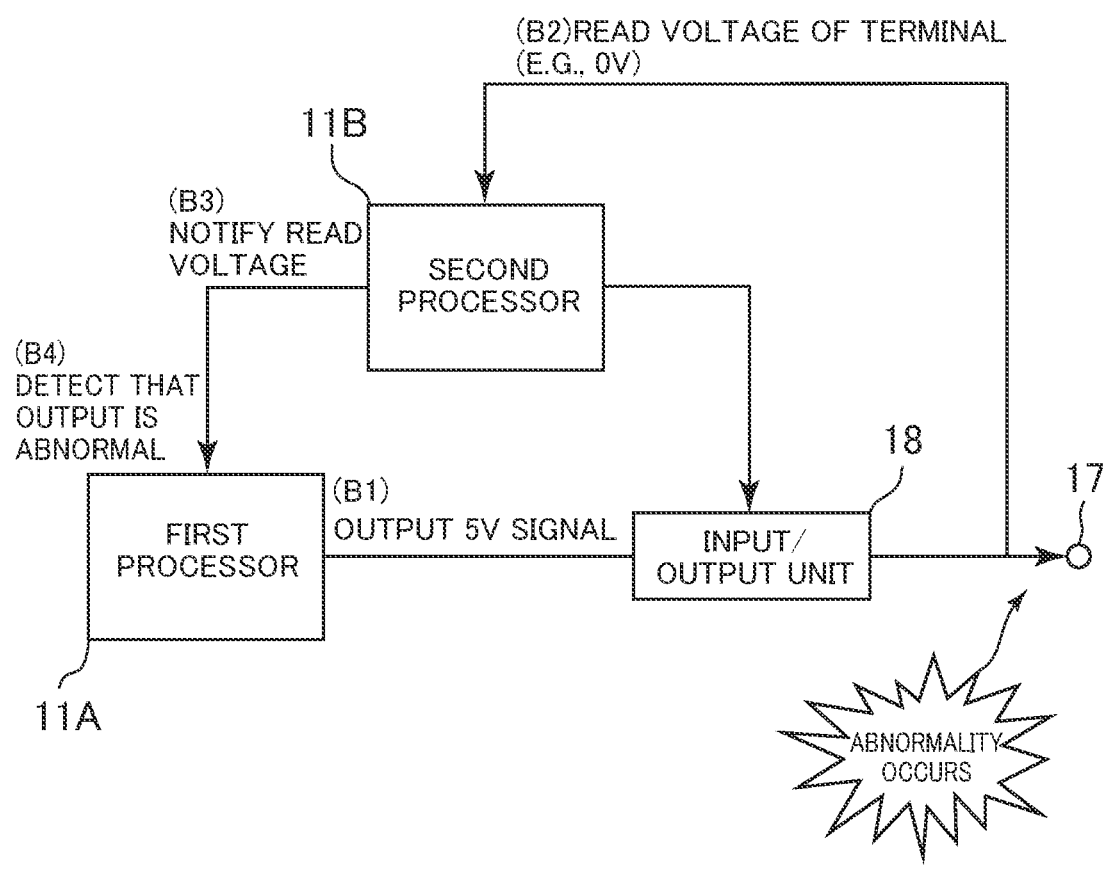
FIG. 5B is a diagram to explain monitoring using two processors.

FIG. 5B shows an example of the case where an abnormality occurs. In the example shown in FIG. 5B, the first processor 11A outputs a signal of 5V to the terminal 17 to which a VCC terminal of a motor, for example, is connected (B1). However, for example, in the case where a coil of the motor is short-circuited, the voltage of the terminal 17 to which the VCC terminal of the motor is connected can be 0V, as that of a GND terminal. In this case, as in the example shown in FIG. 5A, the second processor 11B reads the voltage value of the terminal 17 (B2), and the second processor 11B notifies the first processor 11A of the read voltage value (e.g., 0V) (B3). In this case, the first processor 11A determines that an abnormality occurs, since the voltage value notified from the second processor 11B falls outside the predetermined normal range (B4). In this case, the first processor 11A stops the output to the terminal 17, for example.

Figure 5C:
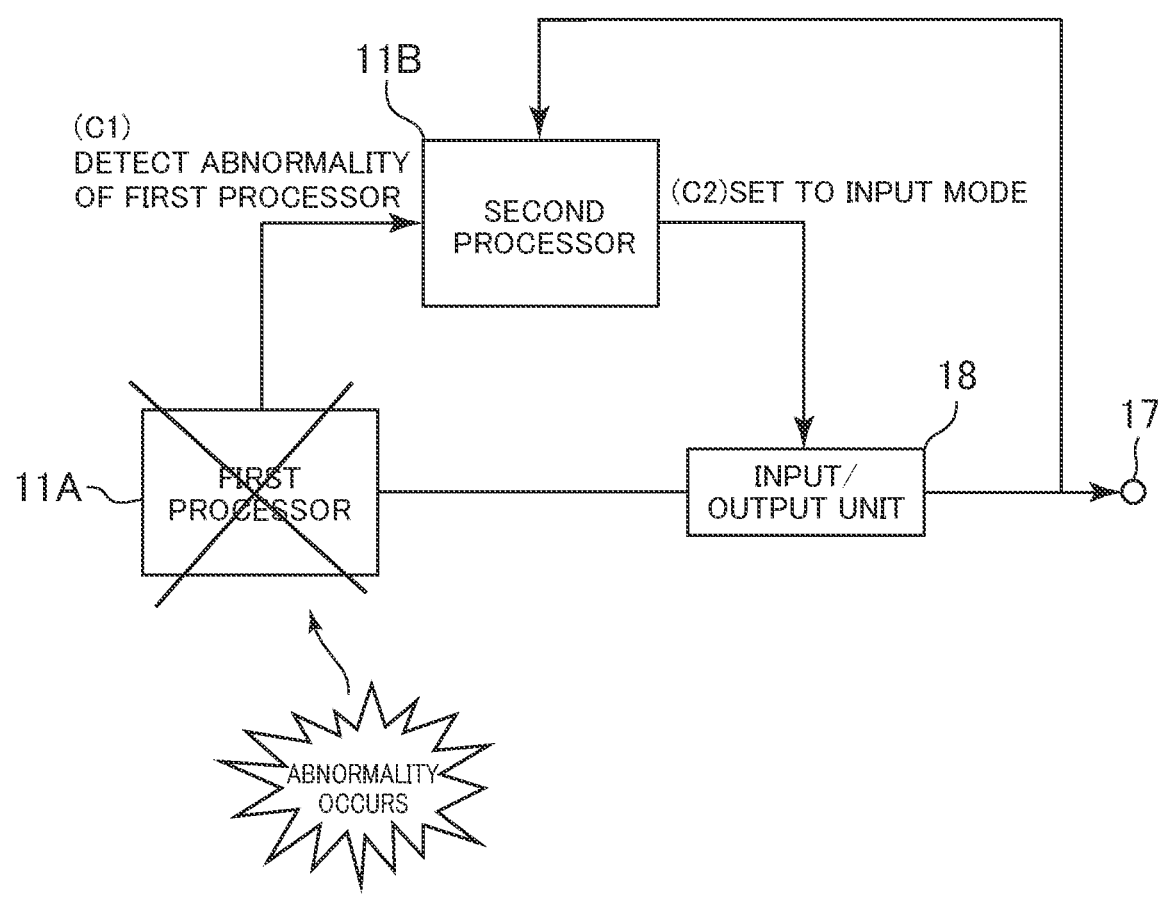
FIG. 5C is a diagram to explain monitoring using two processors.

FIG. 5C shows an example of the case where an abnormality occurs at the first processor 11A. The first processor 11A executes various types of processings such as control of the communication unit 13, and execution of a command which is received via the server system 3 to be described later. Therefore, there is a case where processing is not normally executed due to some reason, and the processor 11A stops or gets out of control. In this case, since the communication between the first processor 11A and the second processor 11B is not normally performed, the second processor 11B determines that an abnormality occurs at the first processor 11A (C1), and therefore the input/output unit 18 is set to an input mode (the states shown in FIG. 4C or 4D), in order to protect an electronic component connected to the terminal 17 (C2).

Figure 5D:
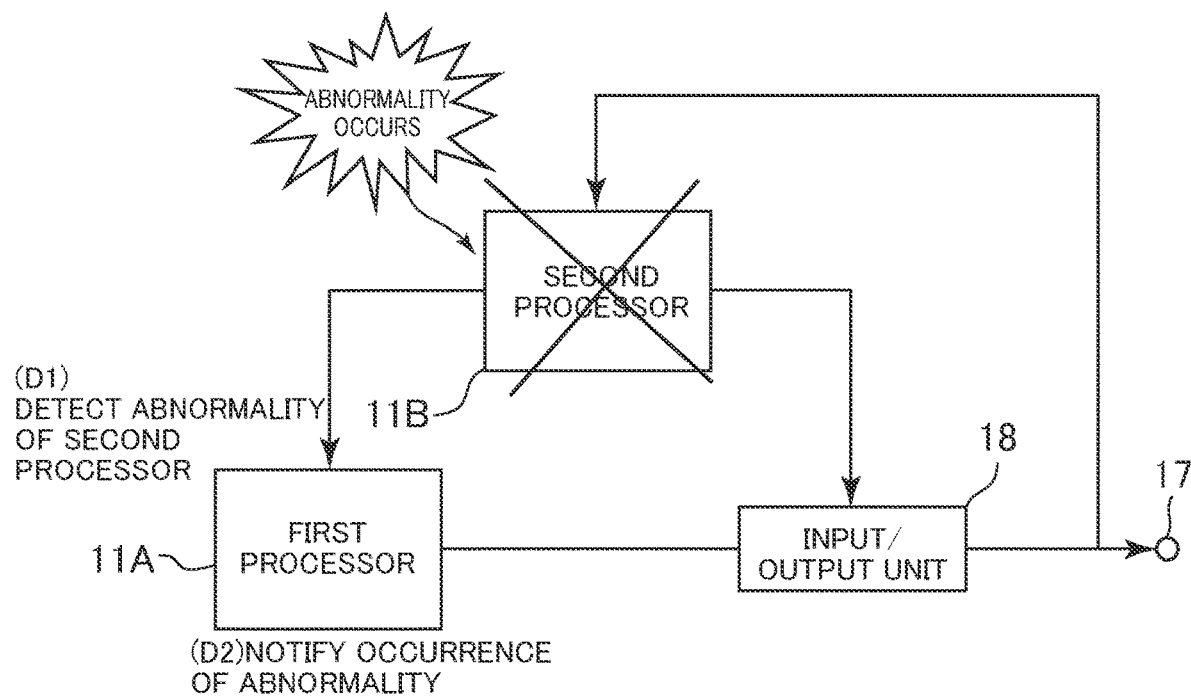
FIG. 5D is a diagram to explain monitoring using two processors.

FIG. 5D shows an example of the case where an abnormality occurs at the second processor 11B. The second processor 11B is connected to a position which is close to the terminal 17 more than the first processor 11A, and therefore possibly receives an electrically or physically bad influence from an electronic component (a circuit) connected to the terminal 17. As a result, there is a case where an abnormality occurs at the second processor 11B. In this case, since the communication between the first processor 11A and the second processor 11B is not normally performed, the first processor 11A determines that an abnormality occurs at the second processor 11B (D1). Therefore the first processor 11A displays, on the display unit 16, a notification indicating that the abnormality occurs, and transmits that notification to the server system 3 (D2). The notification transmitted to the server system 3 is transmitted to the user terminal 20 by the server system 3, for example.

As seen above, in the present embodiment, the two processors (the first processor 11A and the second processor 11B) are prepared for each terminal 17, and whether the control performed by one of the processors (the first processor 11A) is normally performed or not is monitored by the other processor (the second processor 11B). Further, the processors monitor each other's condition. Therefore, even if an abnormality occurs, it is possible to deal with that abnormality properly.

[3. Use Procedure of Basic Part] A procedure which is proceeded with when the user uses the basic part 10 is described. As has been described above, by editing a program on the user terminal 20 and having the user terminal 20 execute the program, the user can control the electronic component connected to the basic part 10. For example, by having the user terminal 20 execute the program, the user can have the LED connected to the terminal 17 emit light, or can rotate the servomotor connected to the terminal 17. Below, a procedure which the user proceeds with for those purposes is described.

[3-1] A procedure is described which is to be proceeded with until a program editing screen for editing a program is displayed on the display unit 26 of the user terminal 20.

Firstly, the user connects an electric power source to the USB terminal 14 of the basic part 10 via the USB cable. When the electric power source is connected to the USB terminal 14 of the basic part 10, the basic part 10 is started up. In this case, if the wireless LAN setting have not been performed (or if, even in the case where the wireless LAN setting have been performed, the basic part 10 cannot be connected to the wireless LAN), the control unit 11 displays a screen to receive an input of information to connect to the wireless LAN on the display unit 16. In this case, the user operates the operation unit 15 to input information such as an SSID and a password.

Figure 6:
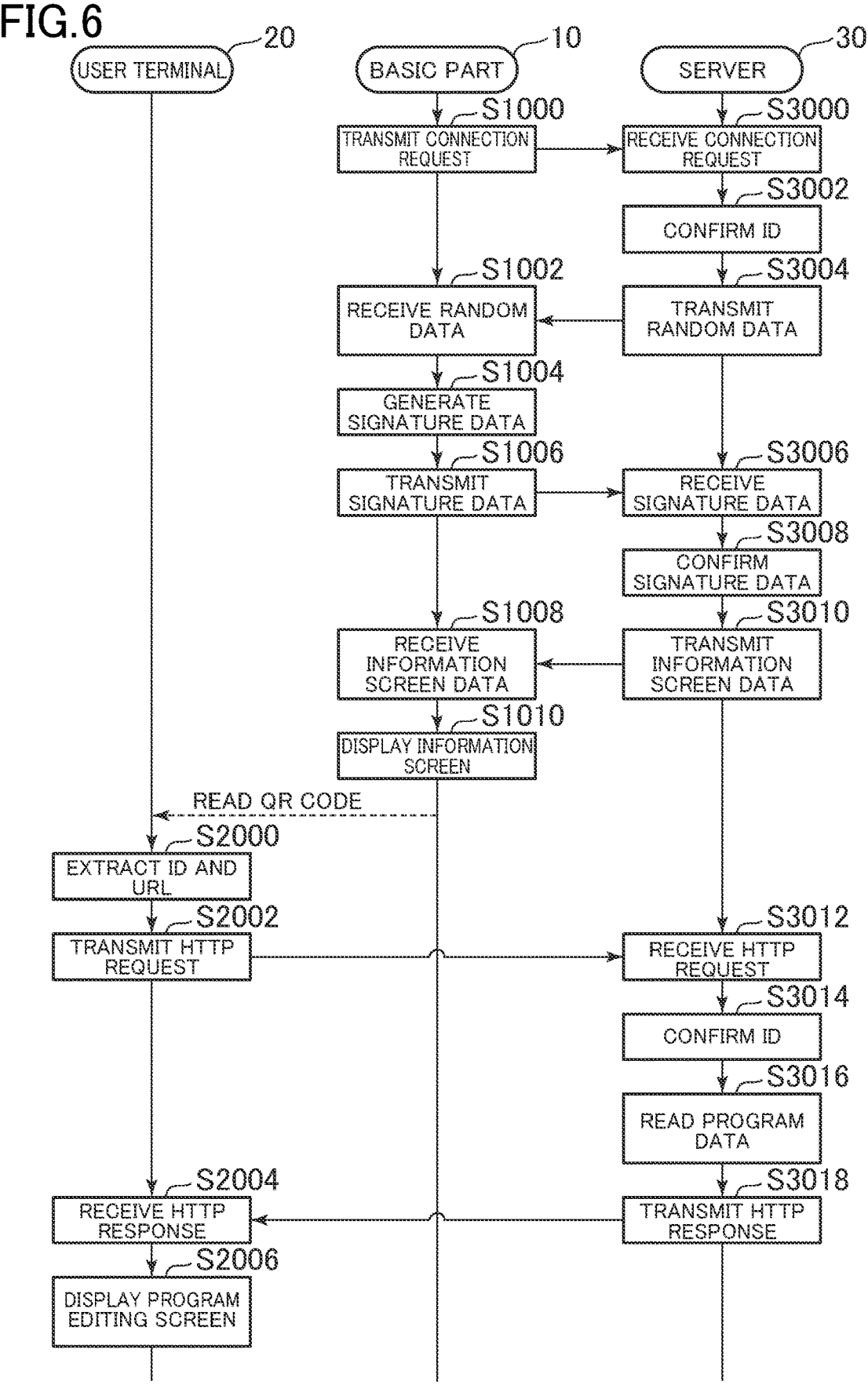
FIG. 6 is a diagram which shows an example of processings executed in the control system.

If the basic part 10 is connected to the wireless LAN, processings such as those shown in FIG. 6 are executed. As shown in FIG. 6, the control unit 11 of the basic part 10 transmits a connection request to the server 30 by the connection unit 13 (S1000), the server 30 receives the connection request via the communication unit 33 (S3000). In the storage unit 12 of the basic part 10, an ID is stored which is identification information to uniquely identify the basic part 10, and this ID is transmitted to the server 30 together with the connection request.

When the connection request is received by the server 30, the control unit 31 of the server 30 determine whether or not the ID received together with the connection request is registered in the database 34, to thereby confirm whether or not the ID is valid (S3002). Further, if the ID is confirmed to be valid, the control unit 31 transmits random data which is randomly generated back to the basic part 10 via the communication unit 33 (S3004), and the basic part 10 receives the random data via the communication unit 13 (S1002).

When the random data is received by the basic part 10, the control unit 11 generates signature data based on a secret key stored in the storage unit 12 (S1004). Further, the control unit 11 transmits the signature data together with a hush value of the random data received in step S1002 to the server 30 via the communication unit 13 (S1006), and the server 30 receives the signature data and the hush value via the communication unit 33 (S3006).

When the signature data and the hush value is received by the server 30, the control unit 31 determines whether or not the signature data is valid based on a public key stored in the database 34 and the hush value (S3008). Further, if the signature data is confirmed to be valid, a communication-connection (a full-time connection using WebSocket) between the basic part 10 and the server 30 is established. In this case, the control unit 31 generates information screen data which indicates information about the basic part 10, and transmits the information screen data to the basic part 10 via the communication unit 33 (S3010).

The basic part 10 receives the information screen data via the communication unit 13 (S1008), and the control unit 11 displays an information screen on the display unit 16 based on the information screen data (S1010).

Figure 7:
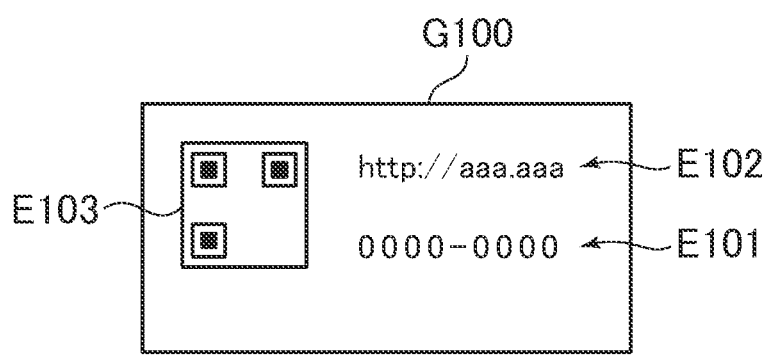
FIG. 7 is a diagram which shows an example of an information screen displayed on a display unit of the basic part.

FIG. 7 is a diagram which shows an example of the information screen displayed on the display unit 16 of the basic part 10. As shown in FIG. 7, an information screen G100 includes display components E101, E102, and E103.

The display component E101 indicates an ID of the basic part 10. In the example shown in FIG. 7, the ID of the basic part 10 is shown as "0000-0000". The display component E102 indicates a URL which should be accessed in order to display, on the user terminal 20, a program editing screen for editing a program to control the basic part 10. A website (a webpage) indicated by this URL is provided by the server 30. The server 30 which provides this website may be a server other than the server 30 which executes steps S3000 to S3010 described as above.

Further, the display component E103 indicates a QR code (a registered trademark) to which the ID of the basic part 10 and the URL as described above are embedded. Although here the QR code is used, a code image other than the QR code may be used.

Note that in step S1006, information on a location of the basic part 10 may be transmitted to the server 30. Further, in step S3010, the control unit 31 may transmit, to the basic part 10, the information screen data for displaying a URL of a website which is suitable for the location of the basic part 10 as the display component E102 and displaying the QR code to which that URL is embedded as the display component E103. For example, it may be configured that if the basic part 10 is located in Japan, the display components E102 and E103 which indicate a URL of a website provided by the server 30 located in Japan are displayed on the information screen G100, and if the basic part 10 is located in the US, the display components E102 and E103 which indicate a URL of a website provided by the server 30 located in the US are displayed on the information screen G100.

For example, the user has the imaging unit 24 of the user terminal 20 read the QR code displayed on the information screen G100. In this case, the control unit 21 of the user terminal 20 extract the URL and the ID embedded to the read QR code (S2000). Further, the control unit 21 starts up a web browser, and transmits an HTTP request to the server 30 via the communication unit 23 based on the URL extracted in step S2000 (S2002), and the server 30 receives the HTTP request via the communication unit 33 (S3012). The HTTP request contains the ID extracted from the QR code.

When the HTTP request is received by the server 30, the control unit 31 determines whether or not the ID received together with the HTTP request is registered in the database 34, to thereby confirm whether or not the ID is valid (S3014). If the received ID is confirmed to be valid, the control unit 31 reads program data stored in association with the ID (S3016).

Figure 8:
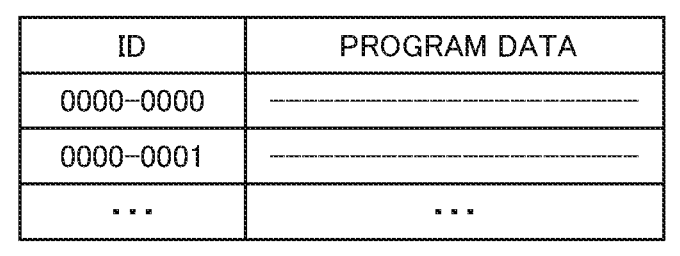

In the present embodiment, as shown in FIG. 8, the program data is stored in the database 34 in association with the ID of each basic part 10. For example, in the initial condition, data of a sample program is stored in association with the ID of each basic part 10. Further, after the user has created a program for the basic part 10, data of the program which the user has created is stored in the database 34 in association with the ID of the basic part 10. Therefore, in step S3016, the control unit 31 reads, from the database 34, the program data stored in association with the ID received in step S3012. Although in the example shown in FIG. 8, one set of program data is stored with respect to one ID, but a plurality of sets of program data may be stored with respect to one ID.

After executing step S3016, the control unit 31 transmits an HTTP response including the read program data back to the user terminal 20 via the communication unit 33 (S3018), and the user terminal 20 receives the HTTP response via the communication unit 23 (S2004). Then, the control unit 21 displays the program editing screen on the display unit 26 based on the HTTP response (S2006).

Figure 9:
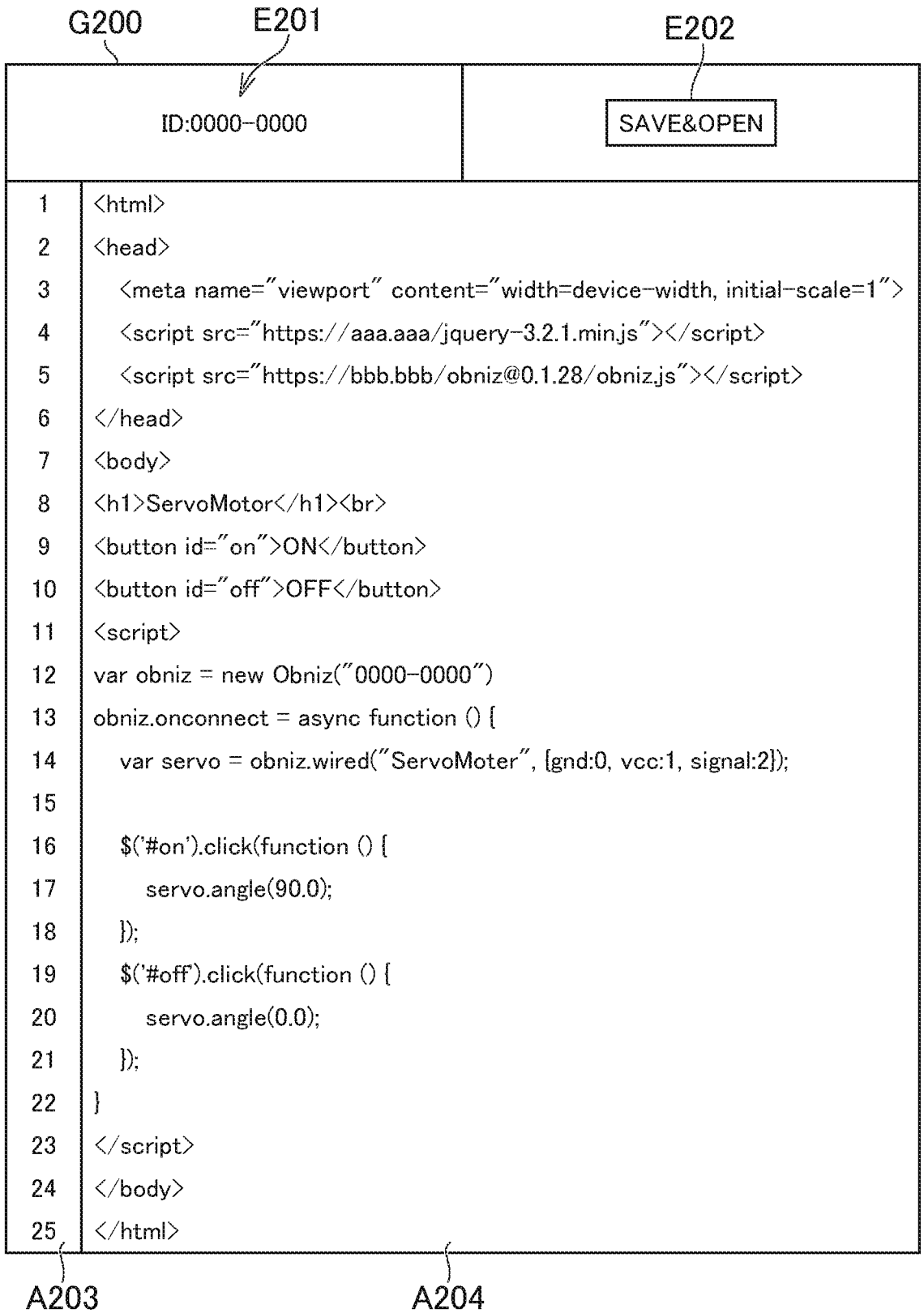
FIG. 9 is a diagram which shows an example of a program editing screen.

FIG. 9 shows an example of the program editing screen. As shown in FIG. 9, the program editing screen G200 includes the display components E201 and E202, a line number region A203, and an editing region A204. The display component E201 indicates an ID of the basic part 10 which is a subject of the program. The display component E202 is a button to save and execute the program. The line number region A203 shows a line number. The editing region A204 is a region where the user edits the program, and the program edited by the user is displayed thereon. For example, the user edits the program using a software keyboard displayed on the display unit 26, a keyboard connected to the user terminal 20 by a wired or wireless connection, or the like.

Although in the above the case has been described where the user has the imaging unit 24 of the user terminal 20 read the QR code displayed on the information screen G100, the user can display the program editing screen G200 the same as that in FIG. 9 on the display unit 26 of the user terminal 20, also by starting up the web browser on the user terminal 20, inputting the URL (the display component E102) displayed on the information screen G100, and inputting the ID (the display component E101) displayed on the information screen G100 in response to a request for an input of the ID of the basic part 10.

[4. Example Program (1)] An example of a program to control the basic part 10 is described.

In the control system 1 according to the present embodiment, a user can create a program to control the basic part 10, using a known programming language such as Java script (a registered trademark). Here, an example of the program created using Java script is described, but another programming language can be used as well.

Figure 10:
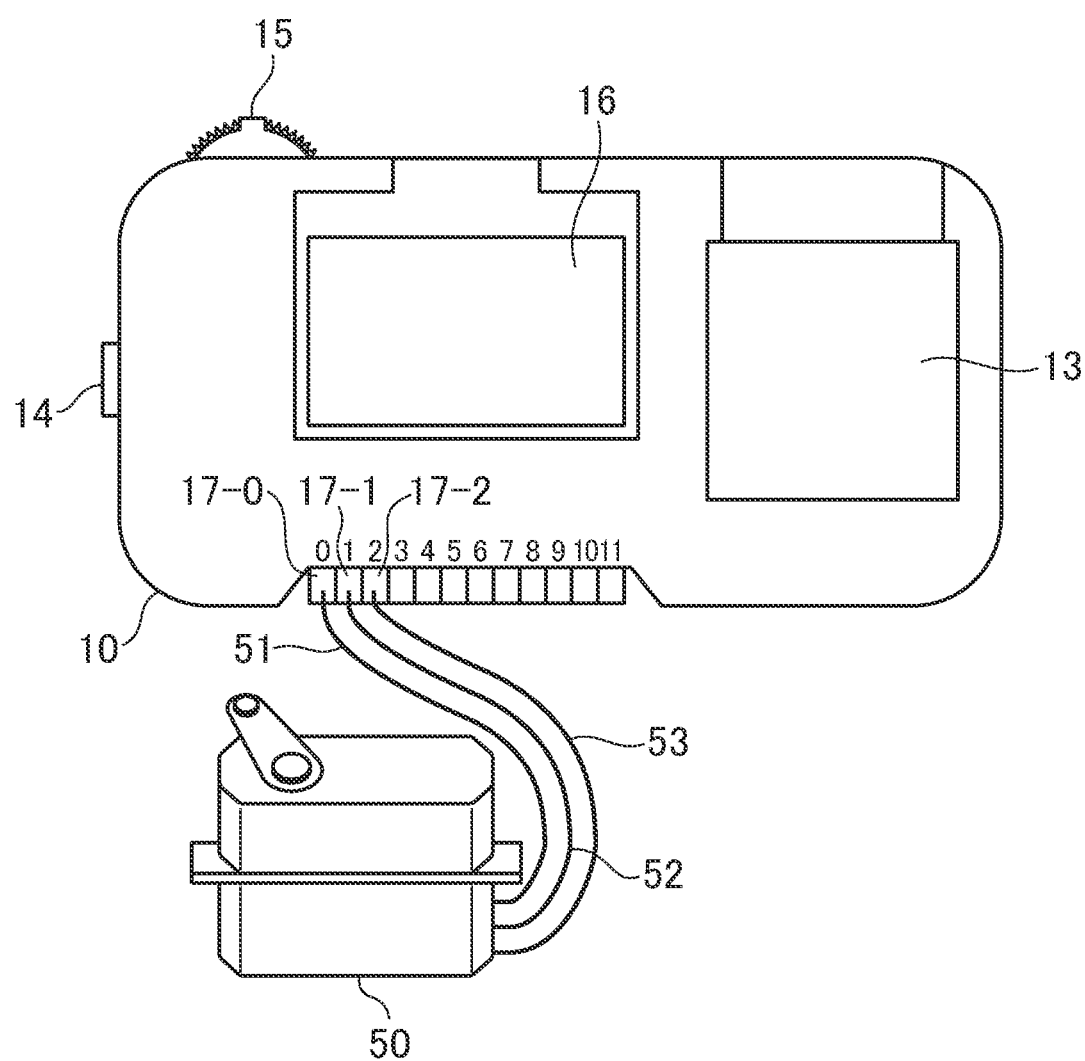
FIG. 10 is a diagram which shows an example of connecting a servomotor to the basic part.

The program (an HTML code) shown in FIG. 9 (the editing region A204) is an example of the program to control the basic part 10 to which the servomotor 50 is connected, as shown in FIG. 10. Specifically, the program shown in FIG. 9 is a program to rotate the servomotor 50 by 90 degrees when an ON button displayed on the web browser is pressed (clicked, tapped, or the like), and to return the servomotor 50 to the original state (to 0 degrees) when the OFF button displayed on the web browser is pressed. In the example shown in FIG. 10, a minus line (GND) 51 of the servomotor 50 is connected to the terminal 17-0, a plus line (VCC) 52 is connected to the terminal 17-1, and a signal line 53 is connected to the terminal 17-2. The servomotor 50 may be connected to another terminal 17.

In the fifth line of the program shown in FIG. 9, a library stored in the library providing server 40 is taken in. As described above, this library includes a library of the API to communication-connect the user terminal 20 to the server system 3 and to control various types of electronic components connected to the basic part 10. Even if the user does not have a detailed knowledge as to communication-connection or a detailed knowledge as to control of the electronic components, the user can easily create a program by taking in the library and utilizing the API. For example, in the control system 1 according to the present embodiment, the user terminal 20 is connected to the server system 3 via WebSocket, but even if the user does not have a detailed knowledge of WebSocket, the user can easily create a program by taking in the library and utilizing the API.

Further, a ninth and tenth lines portion of the program shown in FIG. 9 corresponds to a portion to display the ON button and the OFF button.

Further, an eleventh to twenty-third lines portion of the program shown in FIG. 9 corresponds to a Java script portion to control the servomotor 50 connected to the basic part 10. In the Java script portion the API is utilized. A sixteenth to eighteenth lines portion corresponds to a portion to rotate the servomotor 50 by 90 degrees when the ON button is pressed, and A nineteenth to twenty-first lines portion corresponds to a portion to return the servomotor 50 to the original state (to 0 degrees) when the OFF is pressed. Details of the Java script portion will be described later.

When the display component E202 of the program editing screen G200 is pressed, saving and execution of the program (the HTML code) displayed on the editing region A204 is performed.

That is, when the display component E202 is pressed, the program displayed on the editing region A204 is transmitted from the user terminal 20 to the server 30, together with the ID (0000-0000) shown by the display component E201. In this case, the server 30 replaces the program stored in the database 34 in association with the received ID with the received program.

Figure 11:
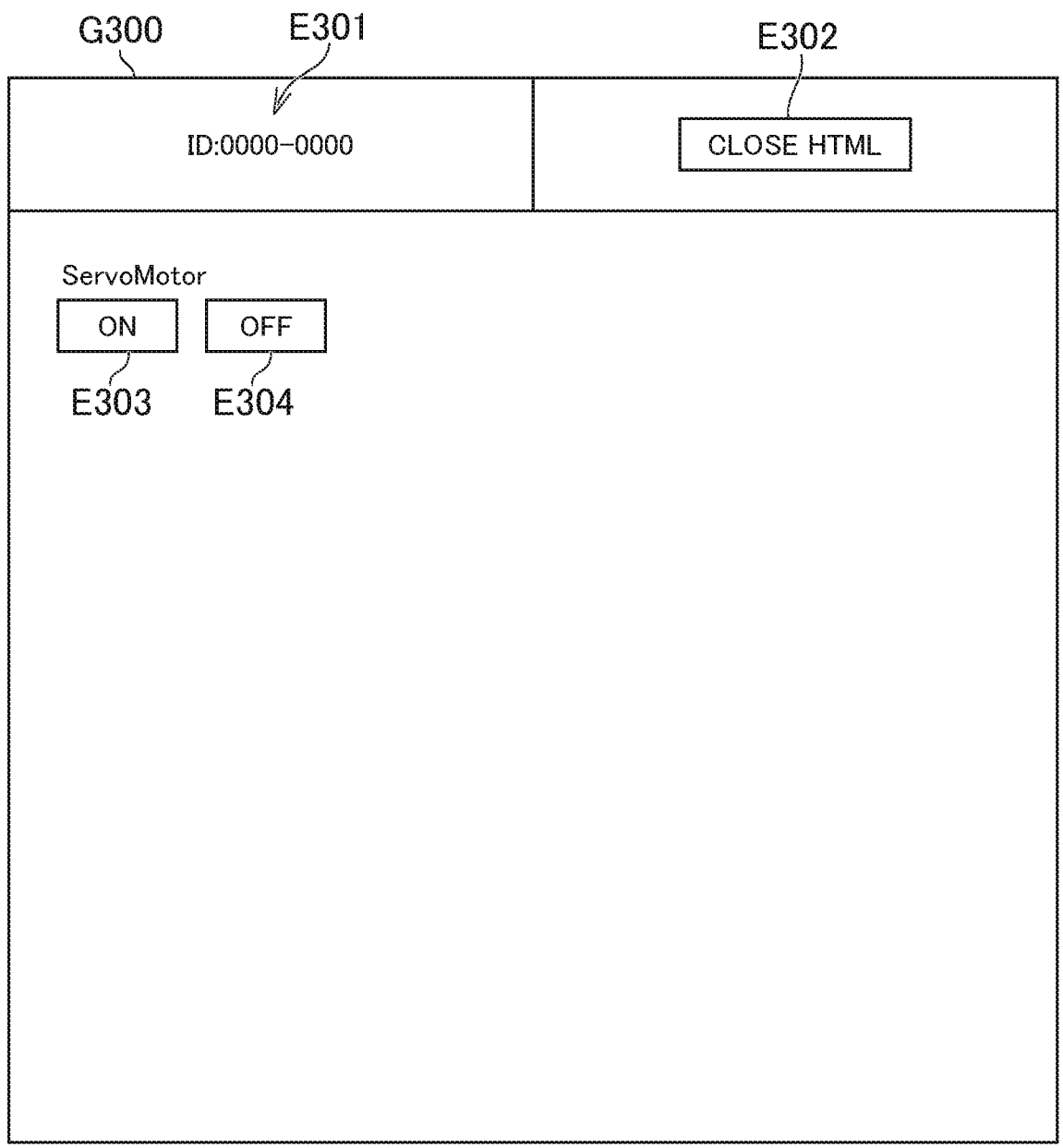
FIG. 11 is a diagram which shows an example of an execution screen.

Further, when the display component E202 is pressed, the program (the HTML code) displayed on the editing region A204 is executed. In this case, an execution screen G300 as shown in FIG. 11 is displayed on the display unit 26 of the user terminal 20. The execution screen G300 shown in FIG. 11 includes display components E301, E302, E303, and E304. The display component E301 is the same as the display component E201. The display component E302 is a button to close the execution screen G300 and return to the program editing screen G200. The display component E303 is the ON button, and the display component E304 is the OFF button. When the display component E303 (the ON button) is pressed, the servomotor 50 connected to the basic part 10 is rotated by 90 degrees, and when the display component E304 (the OFF button) is pressed, the servomotor 50 connected to the basic part 10 is returned to the original state (to 0 degrees).

Figure 12:
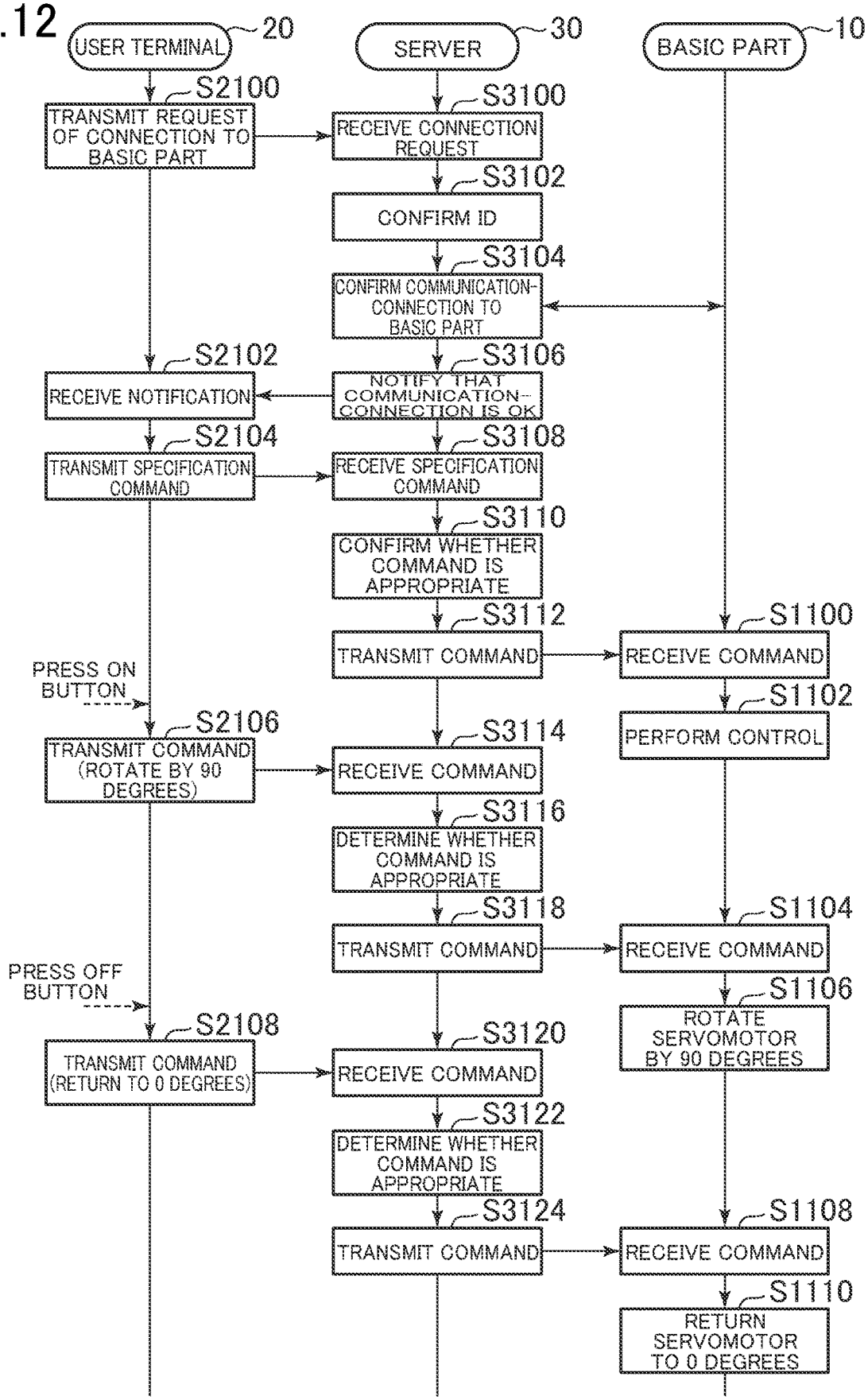
FIG. 12 is a diagram which shows an example of processings executed in the control system.

Here, the Java script portion (the eleventh to twenty-third lines portion) of the program (the HTML code) shown in FIG. 9 is described in detail. FIG. 12 shows an example of processing executed on the user terminal 20, the server 30, and the basic part 10, as a result of the execution of the Java script portion.

In a twelfth line portion of the program shown in FIG. 9, the basic part 10 with the ID "0000-0000" is specified as a control target of the program. Further, in a thirteenth line portion, a communication-connection to the basic part 10 is requested.

As a result of the execution of the twelfth and thirteenth lines portion, step S2100 shown in FIG. 12 is executed. That is, the control unit 21 of the user terminal 20 transmits a request of connection to the basic part 10 with the ID "0000-0000" to the server 30 via the communication unit 23 (S2100). In this case, the ID "0000-0000" is transmitted from the user terminal 20 to the server 30, together with the connection request. As will be described later, the user terminal 20 and the basic part 10 are not directly communication-connected, but data such as a command is transmitted/received between the user terminal 20 and the basic part 10 via the server 30, and therefore the connection request can be referred to as a "relay request" as well.

The server 30 receives the connection request transmitted from the user terminal 20 via the communication unit 33 (S3100). In this case, the control unit 31 of the server 30 confirms, by determining whether the ID received together with the connection request is registered in the database 34 or not, whether or not the ID is valid (S3102).

Then, if it is confirmed that the ID is valid, the control unit 31 determines if the communication-connection is established between the basic part 10 with the received ID "0000-0000" and the server 30 (S3104). As described above, when an electric power supply to the basic part 10 is started and the basic part 10 is started up, the processings of steps S1000 to S1006 and S3000 to S3008 shown in FIG. 6 are executed, and as a result the communication-connection is established between the basic part 10 and the server 30. Further, this communication-connection is maintained until the electric power supply to the basic part 10 is suspended. Therefore, in step S3104, it is confirmed whether or not the communication-connection like this is maintained.

If it is confirmed that the communication-connection is established between the basic part 10 with the received ID "0000-0000" and the server 30, the control unit 31 transmits, to the user terminal 20 via the communication unit 33, a notification indicating that the connection to the basic part 10 is OK (S3106), and the user terminal 20 receives that notification via the communication unit 23 (S2102). In this case, a predetermined procedure is proceeded between the server 30 and the user terminal 20, to thereby establish the communication-connection (the full-time connection using WebSocket).

After that, a fourteenth line portion of the program shown in FIG. 9 is executed. At the fourteenth line portion, it is specified that a type of the electronic component connected to the basic part 10 with the ID "0000-0000" is the servomotor 50, and it is also specified that the minus line (GND) 51, the plus line (VCC) 52, and the signal line 53 of the servomotor 50 are respectively connected to the terminals 17-0, 17-1, and 17-2.

By executing the fourteenth line portion, step S2104 shown in FIG. 12 is executed. That is, the control unit 21 transmits, to the server 30 via the communication unit 23, a specification command which specifies that the minus line (GND) 51, the plus line (VCC) 52, and the signal line. 53 of the servomotor 50 are respectively connected to the terminals 17-0, 17-1, and 17-2 of the basic part 10 with the ID "0000-0000" (S2104). In this case, with respect to each of the terminals 17-0, 17-1, and, 17-2 to which the servomotor 50 is connected, it is determined based on the library by which control mode among the control modes shown in FIG. 4A to FIG. 4D the terminal 17 should be controlled, and a specification command which indicates the determination result is transmitted to the server 30. For example, a command such as "{io0:0,io1:1,pwm0: {io:2,freq:1000}}" is transmitted from the user terminal 20 to the server 30.

The server 30 receives, via the communication unit 33, the specification command transmitted from the user terminal 20 (S3108). Then, the control unit 31 of the server 30 determines whether or not the command received in step S3108 is appropriate (S3110).

For example, in the storage unit 32 of the server 30, a determination standard to determine whether or not the command received from the user terminal 20 is appropriate is stored. For example, types of appropriate commands or inappropriate commands are stored as the determination standard. Therefore, the control unit 31 determines whether or not the type of the command received in step S3108 agrees with some of the types of the appropriate commands (or the types of the inappropriate commands). The control unit 31 determines that the command received in step S3108 is inappropriate, if the type of the command received in step S3108 does not agree with any of the types of appropriate commands or if the type of the command received in step S3108 agrees with some of the types of inappropriate commands, for example.

Further, for example, regarding the basic part 10 with the ID "0000-0000", a history of commands received from the user terminal 20 is stored in the storage unit 32 of the server 30 as a determination standard. Furthermore, the control unit 31 determines whether or not the command received in step S3108 is appropriate, based on that history. For example, if the command to be executed before the command received in step S3108 is not received yet, the control unit 31 determines that the command received in step S3108 is inappropriate.

Though not shown in FIG. 12, if the command received in step S3108 is determined to be inappropriate, the control unit 31 transmits the notification to the effect to the user terminal 20 via the communication unit 33. Then, the content of the notification is displayed on the display unit 26 of the user terminal 20.

Meanwhile, if it is determined that the command received in step S3108 is appropriate, the control unit 31 converts the command received in step S3108 into the format which can be interpreted by the control unit 11 of the basic part 10, and transmits the converted command to the basic part 10 with the ID "0000-0000" via the communication unit 33 (S3112). In this case, the command received in step S3108 is converted into a command of an intermediate code (a byte code) such as "0x03, 0x00, 0x02, 0x00, and 0x02", and the converted command is transmitted to the basic part 10 with the ID "0000-0000".

The basic part 10 with the ID "0000-0000" receives the command transmitted from the server 30 via the communication unit 13 (S1100). In this case, the control unit 11 of the basic part 10 performs control in accordance with the command received in step S1100 (S1102). In the storage unit 12, data for specifying contents of controls corresponding to the respective commands which have ever been received from the server 30 is stored, and the control unit 11 identifies a content of control corresponding to the command received in step S1102 by referring to that data.

In step S1102, for example, the control unit 11 store data in the storage unit 12. The data indicates, with respect to each of the terminals 17-0, 17-1, and 17-2 to which the minus line (GND) 51, the plus line (VCC) 52, and the signal line 53 of the servomotor 50 are connected, by which control mode among the control modes shown in FIG. 4A to FIG. 4D the terminal 17 should be controlled. Further, in this case, the second processor 11B performs the control as shown in FIG. 4B with respect to each of the input/output units 18-0, 18-1, and 18-2 of the terminals 17-0, 17-1, and 17-2 to which the servomotor 50 is connected. Further, the first processor 11A outputs a signal of 0V to the terminal 17-0 to which the minus line (GND) 51 is connected, and outputs a signal of 5V to the terminal 17-1 to which the plus line (VCC) 52 is connected.

Further, as to the program shown in FIG. 9, when the display component E303 (the ON button) displayed on the display unit 26 is pressed, a seventeenth line portion is executed. This seventeenth line portion is for execution of processing to rotate the server motor 50 by 90 degrees. As a result of the execution of this seventeenth line portion, step S2106 shown in FIG. 12 is executed. That is, as shown in FIG. 12, the control unit 21 transmits, to the server 30 via the communication unit 23, the command to rotate, by 90 degrees, the servomotor 50 connected to the terminals 17-0, 17-1, and 17-2 of the basic part 10 with the ID "0000-0000" (S2106). In this case, a command such as "{pwm0: {duty:0.01}}" is transmitted from the user terminal 20 to the server 30.

The server 30 receives, via the communication unit 33, the command transmitted from the user terminal 20 (S3114). Then, the control unit 31 of the server 30 determines whether or not the command received in step S3114 is appropriate (S3116). Step S3116 is the same as step S3110.

If it is determined that the command received in step S3114 is appropriate, the control unit 31 converts the command into the format which can be interpreted by the control unit 11 of the basic part 10, and transmits the converted command to the basic part 10 with the ID "0000-0000" via the communication unit 33 (S3118). In this case, the command received: in step S3114 is converted into a command of the intermediate code (the byte code), and the converted command is transmitted to the basic part 10 with the ID "0000-0000".

The basic part 10 with the ID "0000-0000" receives, via the communication unit 13, the command transmitted from the server 30 (S1104). Then, the control unit 11 of the basic part 10 performs control in accordance with the received command (S1106). In this case, for example, the first processor 11A outputs a signal to rotate the servomotor 50 by 90 degrees to the terminal 17-2 to which the signal line 53 of the servomotor 50 is connected. In this case, the second processor 11B performs the control as shown in FIG. 4B with respect to the input/output unit 18-2 of the terminal 17-2 to which the signal line 53 of the servomotor 50 is connected.

Further, as to the program shown in FIG. 9, if the display component E304 (the OFF button) displayed on the display unit 26 is pressed, a twentieth line portion is executed. This twentieth line portion is for executing processing to return the servomotor 50 to the original state (to 0 degrees). As a result of the execution of this twentieth line portion, step S2108 shown in FIG. 12 is executed. That is, as shown in FIG. 12, the control unit 21 transmits, to the server 30, the command to return, the servomotor 50 connected to the terminals 17-0, 17-1, and 17-2 of the basic part 10 with the ID "0000-0000" to the original state (to 0 degrees) (S2108). In this case, a command such as "{pwm0: {duty:0.02}}" is transmitted from the user terminal 20 to the server 30.

The server 30 receives the command transmitted from the user terminal 20 via the communication unit 33 (S3120). Then, the control unit 31 of the server 30 determines whether or not the command received in step S3120 is appropriate (S3122). Step S3122 is the same as step S3110.

If it is determined that the command received in step S3120 is appropriate, the control unit 31 converts the command into the format which can be interpreted by the control unit 11 of the basic part 10, and transmits the converted command to the basic part 10 with the ID "0000-0000" via the communication unit 33 (S3124). In this case, the command received in step S3120 is converted into a command of the intermediate code (the byte code), and the converted command is transmitted to the basic part 10 with the ID "0000-0000".

The basic part 10 with the ID "0000-0000" receives the command transmitted from the server 30 via the communication unit 13 (S1108). In this case, the control unit 11 of the basic part 10 performs control of the servomotor 50 in accordance with the received command (S1110). In this case, for example, the first processor 11A outputs a signal to return the servomotor 50 to the initial state (to 0 degrees) to the terminal 17-2 to which the signal line 53 of the servomotor 50 is connected. In this case, the second processor 11B performs the control as shown in FIG. 4B with respect to the input/output unit 18-2 of the terminal 17-2 to which the signal line 53 of the servomotor 50 is connected.

As has been described above, in the control system 1 according to the present embodiment, a system can be realized where the servomotor 50 connected to the basic part 10 is made to rotate in accordance with the user's operation on the user terminal 20.

Although in the example which has been described above, the servomotor 50 is connected to the basic part 10, an electric component other than the servomotor 50 may be connected to the basic part 10 as well. For example, it may be configured that the LED is connected to the basic part 10, and the LED connected to the basic part 10 is made to emit light in accordance with the user's operation on the user terminal 20.

Further, it may be configured that if an occurrence of a predetermined event is detected in the user terminal 20, the electronic component connected to the basic part 10 is controlled. For example, it may be configured that if it is detected that a message with a predetermined hashtag is posted, or a reception of an e-mail addressed to a predetermined e-mail address is received, the servomotor 50 connected to the basic part 10 is rotated, or the LED is made to emit light.

[5. Example Program (2)] Another example of the program to control the basic part 10 is described.

Figure 13:
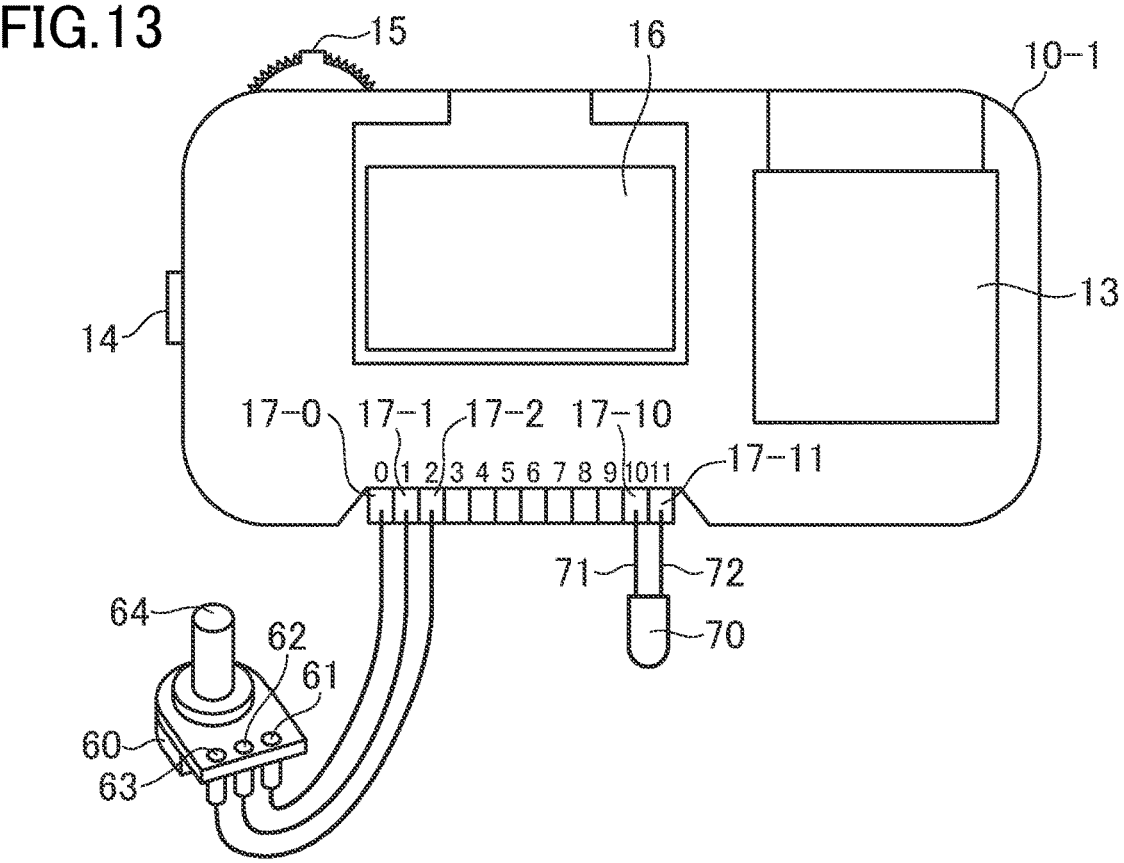
FIG. 13 is a diagram which shows an example of a first basic part to which a volume and an LED are connected, and a second basic part to which the servomotor is connected.
Figure 13:
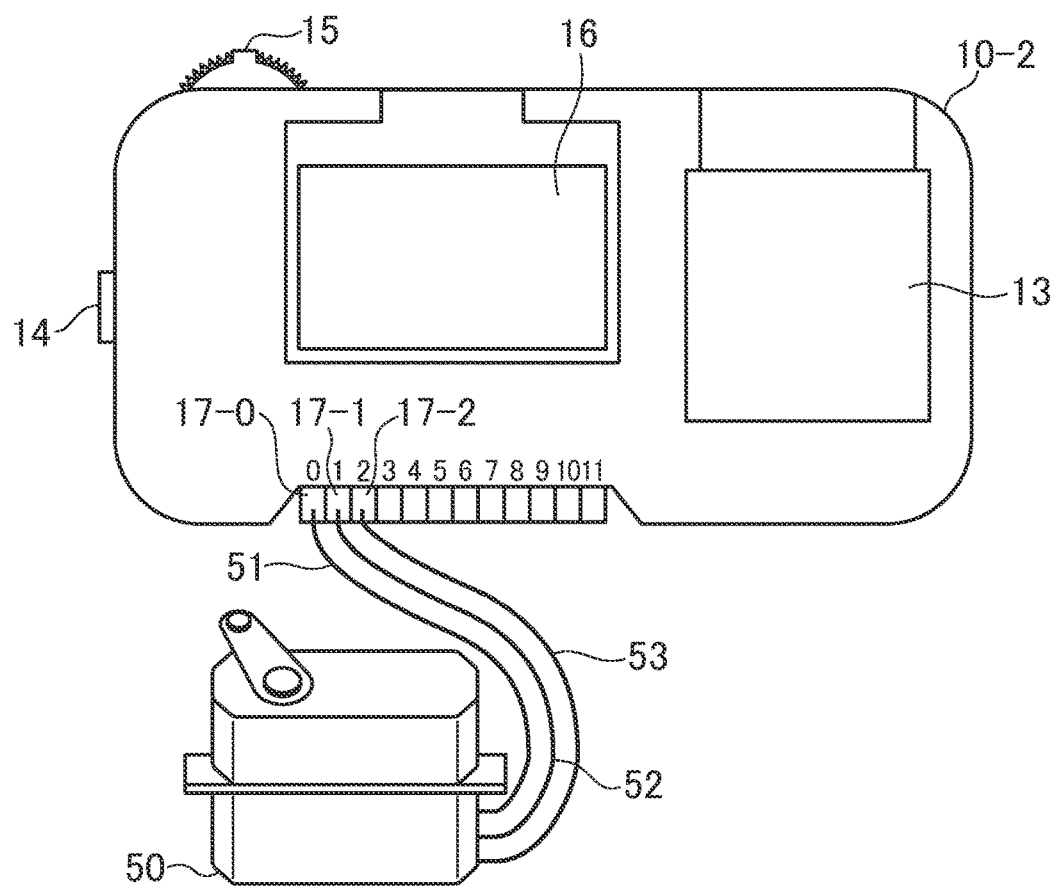

Here, an example of a program is described which coordinates two basic parts 10 is described. Specifically, an example of a program which links a first basic part 10-1 to which a volume 60 and an LED 70 are connected and a second basic part 10-2 to which a servomotor 50 is connected, as shown in FIG. 13. The first basic part 10-1 is the basic part 10 with the ID "0000-0000", and the second basic part 10-2 is the basic part 10 with the ID "1111-1111". Further, the volume 60 is an electronic component such that the resistance value varies as the user turns a knob 64 and a position of the knob 64 (how much the knob 64 has been turned) can be determined based on the resistance value. For example, as a numerical value which indicate a position of the knob 64, a numerical value between "0" and "1" is input from the volume 60 to the first basic part 10-1. "0" corresponds to a state where the knob 64 is not turned (an initial position of the knob 64), "1" corresponds to a state where the knob 64 is turned to the maximum, and "0.5" corresponds to a state where the knob 64 is turned approximately to half the maximum.

In the example shown in FIG. 13, on the first basic part 10-1, a first pin 61, a second pin 62, and a third pin 63 or the volume 60 are respectively connected to the terminals 17-0, 17-1, and 17-2, and an anode 71 and a cathode 72 of the LED 70 are respectively connected to the terminals 17-10, and 17-11. The volume 60 and the LED 70 may be connected to other terminals 17. Meanwhile, on the second basic part 10-2, the minus line (GND) 51, the plus line (VCC) 52, and the signal line 53 of the servomotor 50 are respectively connected to the terminals 17-0, 17-1, and 17-2. The servomotor 50 may be connected to another terminal 17.

Figure 14:
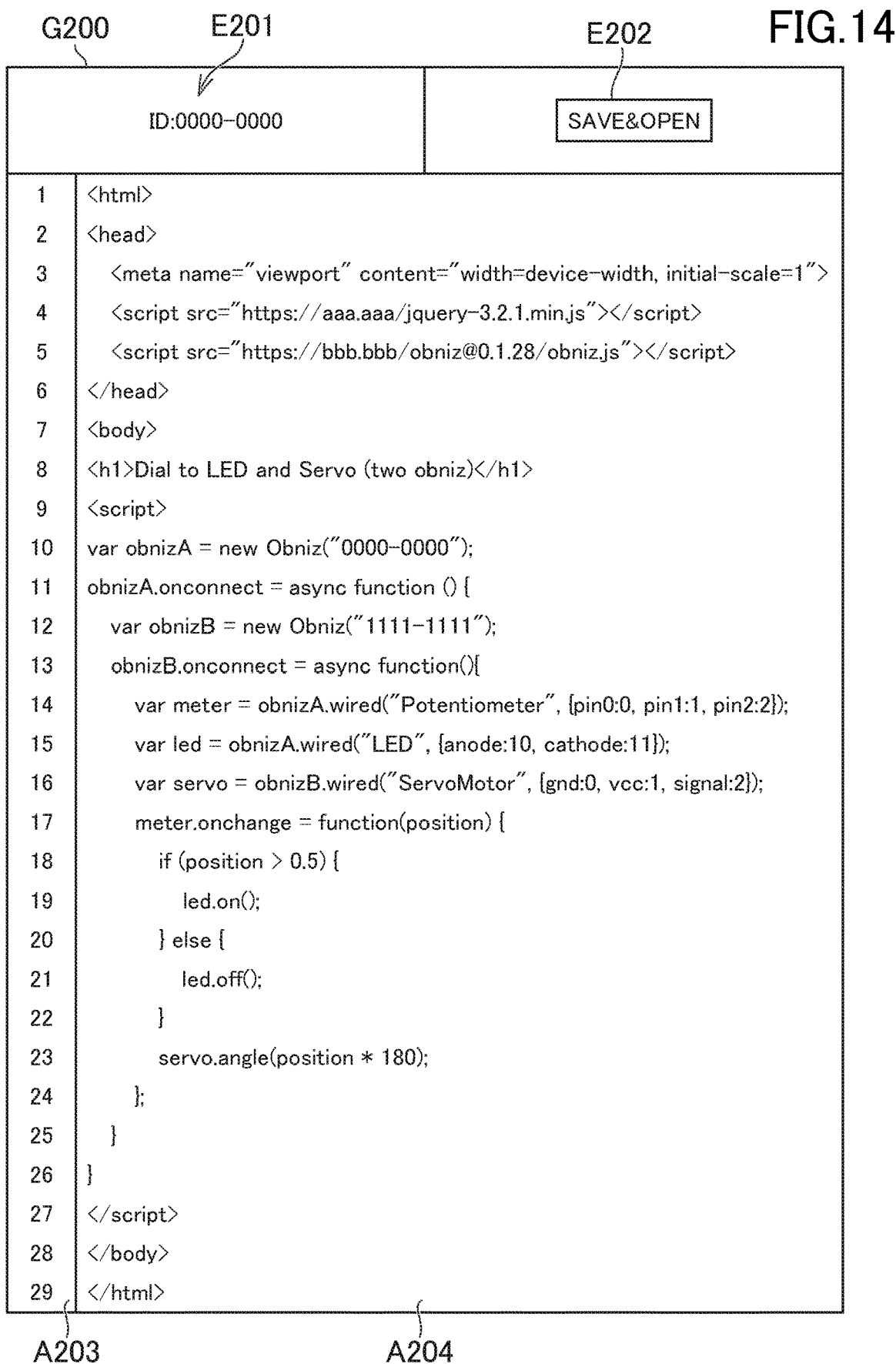
FIG. 14 is a diagram which shows another example of the program editing screen.

FIG. 14 shows an example of the program editing screen G200 as FIG. 9, and a program (an HTML code) for having the LED 70 connected to the first basic part 10-1 emit light if the knob 64 is turned by more than half the maximum and rotating the servomotor 50 connected to the second basic part 10-2 by an angle corresponding to the position of the knob 64, in the case where the user turns the knob 64 of the volume 60 connected to the first basic part 10-1, is displayed on the editing region A204 of FIG. 14.

A first to fifth lines portion of the program shown in FIG. 14 (the editing region A204) is the same as a first to the fifth lines portion of the program shown in FIG. 9 (the editing region A204).

Figure 15A:
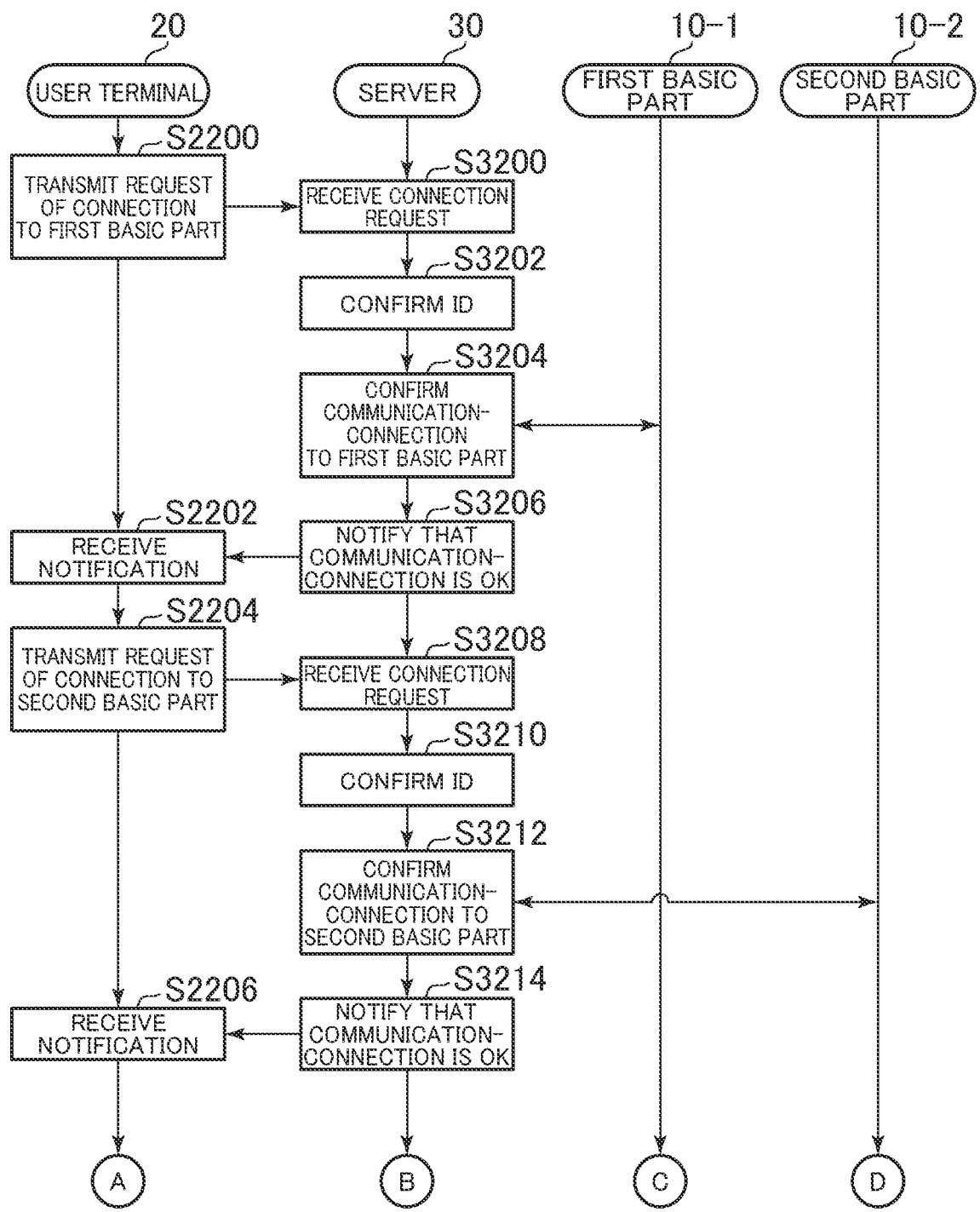
FIG. 15A is a diagram which shows an example of processings executed in the control system.
Figure 15B:
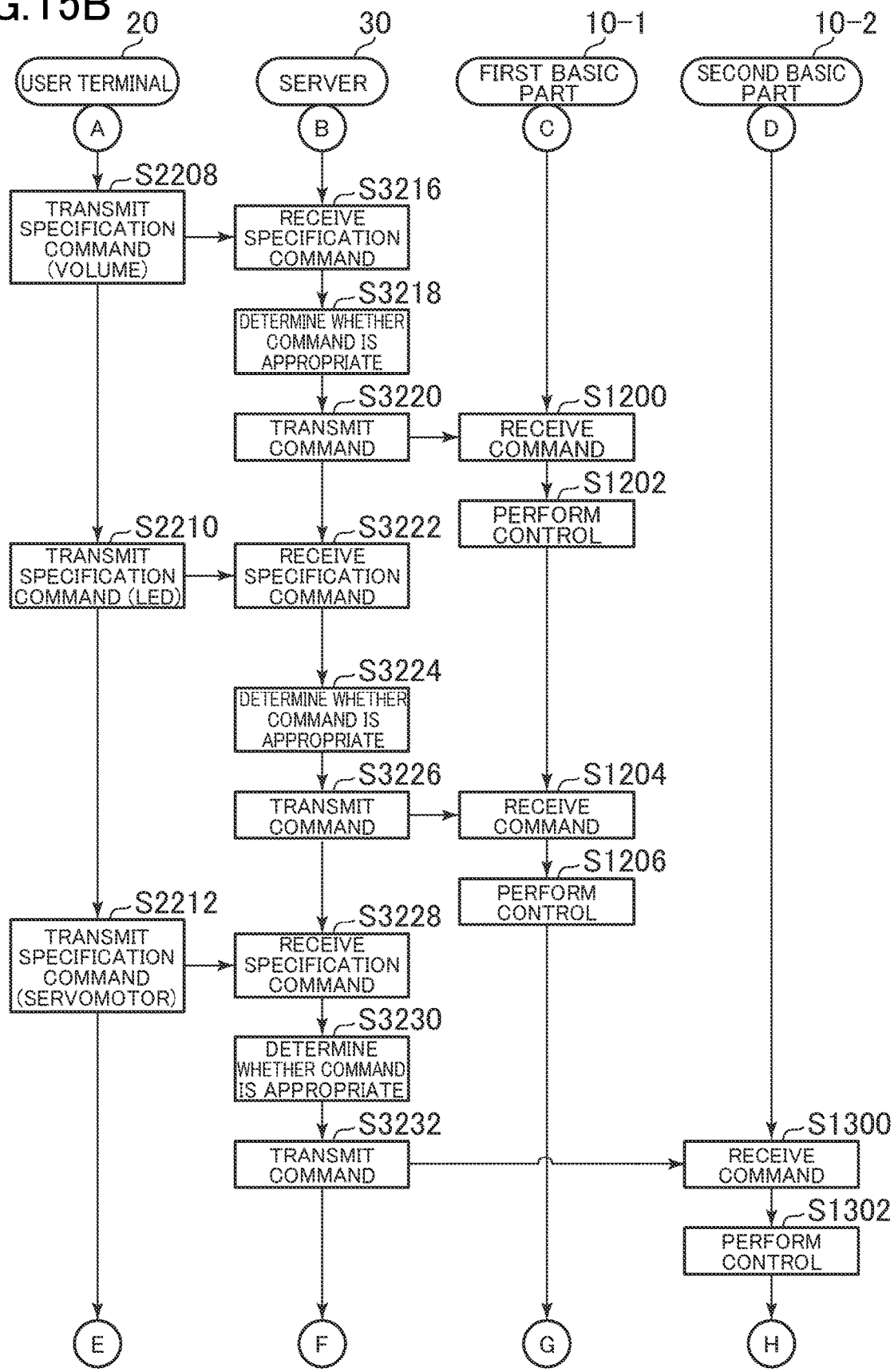
FIG. 15B is a diagram which shows an example of processings executed in the control system.
Figure 15C:
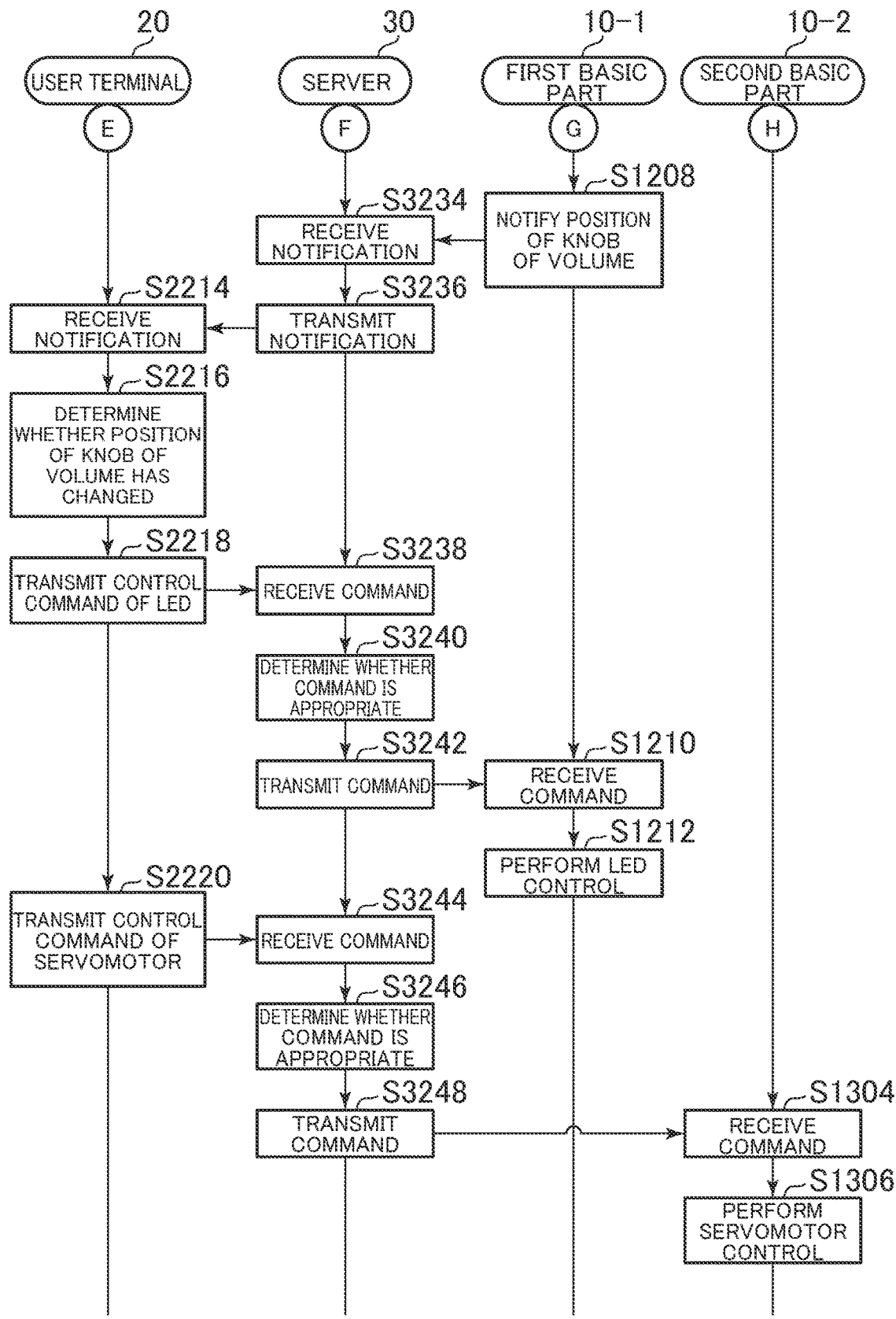
FIG. 15C is a diagram which shows an example of processings executed in the control system.

Further, a ninth to twenty-seventh lines portion of the program shown in FIG. 14 corresponds to the Java script portion to realize the cooperation as described above. FIG. 15A to FIG. 15C show an example of processing executed on the user terminal 20, the server 30, and the basic part 10 as a result of the execution of the Java script portion.

In a tenth line portion of the program shown in FIG. 14, the first basic part 10-1 with the ID "0000-0000" is specified as a first control target of the program. Further, in an eleventh line portion, a communication-connection to the first basic part 10-1 is requested.

As a result of execution of those portions, step S2200 shown in FIG. 15A is executed. That is, the control unit 21 of the user terminal 20 transmits a request of connection to the first basic part 10-1 with the ID "0000-0000" to the server 30 via the communication unit 23 (S2200). In this case, the ID "0000-0000" is transmitted form the user terminal 20 to the server 30 together with the connection request. As will be described later, the user terminal 20 and the first basic part 10-1 are not directly communication-connected, but data such as a command is transmitted/received between the user terminal 20 and the first basic part 10-1 via the server 30, and therefore the connection request can be referred to as a "relay request".

The server 30 receives the connection request transmitted from the user terminal 20 via the communication unit 33 (S3200). In this case, the control unit 31 of the server 30 determines whether or not the ID received together with the connection request is registered in the database 34, to thereby confirm whether or not the ID is valid (S3202). Then, if it is confirmed that the ID is valid, the control unit 31 determines whether or not the communication-connection is established between the first basic part 10-1 with the received ID "0000-0000" and the server 30 (S3204). Steps S3202 and S3204 are the same as steps S3102 and S3104 of FIG. 12.

If it is confirmed that the communication-connection is established between the first basic part 10-1 and the server 30, the control unit 31 transmits, to the user terminal 20 via the communication unit 33, a notification that the connection to the first basic part 10-1 is OK (S3206), and the user terminal 20 receives the notification via the communication unit 23 (S2202). In this case, a predetermined communication is performed between the server 30 and the user terminal 20, to thereby establish the communication-connection (the full-time connection using WebSocket).

After that, a twelfth to thirteenth lines portion of the program shown in FIG. 14 is executed. In a twelfth line portion, the second basic part 10-2 with the ID "1111-1111" is specified as a second control target of the program. Further, in a thirteenth line portion, a communication-connection to the second basic part 10-2 is requested.

As a result of execution of those portions, step S2204 shown in FIG. 15A is executed. That is, the control unit 21 of the user terminal 20 transmits a request of connection to the second basic part 10-2 with the ID "1111-1111" to the server 30 via the communication unit 23 (S2204). In this case, the ID "1111-1111" is transmitted form the user terminal 20 to the server 30 together with the connection request. As will be described later, the user terminal 20 and the second basic part 10-2 are not directly communication-connected, but data such as a command is transmitted/received between the user terminal 20 and the second basic part 10-2 via the server 30, and therefore the connection request can be referred to as a "relay request".

The server 30 receives the connection request transmitted from the user terminal 20 via the communication unit 33 (S3208). In this case, the control unit 31 of the server 30 determines whether or not the ID received together with the connection request is registered in the database 34, to thereby confirm whether or not the ID is valid (S3210). Then, if it is confirmed that the ID is valid, the control unit 31 determines whether or not the communication-connection is established between the second basic part 10-2 with the received ID "1111-1111" and the server 30 (S3212). Steps S3210 and S3212 are the same as steps S3102 and S3104 of FIG. 12.

If it is confirmed that the communication-connection is established between the second basic part 10-2 and the server 30, the control unit 31 transmits, to the user terminal 20 via the communication unit 33, a notification that the connection to the second basic part 10-2 is OK (S3214), and the user terminal 20 receives the notification via the communication unit 23 (S2206).

After that, a fourteenth line portion of the program shown in FIG. 14 is executed. In the fourteenth line portion, it is specified that a type of the electronic component connected to the first basic part 10-1 with the ID "0000-0000" is the volume 60 (a potentiometer), and it is also specified that the first pin 61, the second pin 62, and the third pin 63 of the volume 60 are respectively connected to the terminals 17-0, 17-1, and 17-2.

As a result of the execution of the fourteenth line portion, step S2208 shown in FIG. 15B is executed. That is, the control unit 21 of the user terminal 20 transmits, to the server 30, a specification command which specifies that the first pin 61, the second pin 62, and the third pin 63 of the volume 60 (the potentiometer) are respectively connected to the terminals 17-0, 17-1, and 17-2 of the first basic part 10-1 with the ID "0000-0000" (S2208). In this case, with respect to each of the terminals 17-0, 17-1, and 17-2 to which the volume 60 is connected, it is determined based on the library by which control mode among the control modes shown in FIG. 4A to FIG. 4D the terminal 17 should be controlled, and a specification command which indicates the determination result is transmitted to the server 30.

The server 30 receives the specification command transmitted from the user terminal 20 via the communication unit 33 (S3216). Then, the control unit 31 of the server 30 determines whether or not the command received in step S3216 is appropriate (S3218). Step S3218 is the same as step S3110 of FIG. 12.

If it is determined that the command received in step S3216 is appropriate, the control unit 31 converts the command received in step S3216 into the format which can be interpreted by the control unit 11 of the first basic part 10-1, and transmits the converted command to the first basic part 10-1 with the ID "0000-0000" via the communication unit 33 (S3220). In this case, the command received in step S3216 is converted into a command of the intermediate code (the byte code), and the converted command is transmitted to the first basic part 10-1 with the ID "0000-0000".

The first basic part 10-1 with the ID "0000-0000" receives the command transmitted from the server 30 via the communication unit 13 (S1200). In this case, the control unit 11 of the first basic part 10-1 performs control in accordance with the received command (S1202). For example, the control unit 11 stores data in the storage unit 12. The data indicates, with respect to each of the terminals 17-0, 17-1, and 17-2 to which the first pin 61, the second pin 62, and the third pin 63 of the volume 60 are connected, by which control mode among the control modes shown in FIG. 4A to FIG. 4D the terminal 17 should be controlled. In this case, the second processor 11B performs the control as shown in FIG. 4A with respect to the input/output units 18-0 and 18-2 of the terminals 17-0 and 17-2, and performs the control as shown in FIG. 4D with respect to the input/output unit 18-1 of the terminal 17-1, to thereby put the first basic part 10-1 into a state to accept an input from the volume 60 via the terminal 17-1.

After that, a fifteenth line portion of the program shown in FIG. 14 is executed. In the fifteenth line portion, it is specified that a type of the electronic component connected to the first basic part 10-1 with the ID "0000-0000" is the LED 70, and it is also specified that the anode 71 and the cathode 72 of the LED 70 are respectively connected to the terminals 17-10 and 17-11.

As a result of the execution of the fifteenth line portion, step S2210 shown in FIG. 15B is executed. That is, the control unit 21 of the user terminal 20 transmits, to the server 30 via the communication unit 23, a specification command which specifies that the anode 71 and the cathode 72 of the LED 70 are respectively connected to the terminals 17-10 and 17-11 of the first basic part 10-1 with the ID "0000-0000" (S2210). In this case, with respect to each of the terminals 17-10 and 17-11 to which the LED 70 is connected, it is determined based on the library by which control mode among the control modes shown in FIG. 4A to FIG. 4D the terminal 17 should be controlled, and a specification command which indicates the determination result is transmitted to the server 30.

The server 30 receives the specification command transmitted from the user terminal 20 via the communication unit 33 (S3222). Then, the control unit 31 of the server 30 determines whether or not the command received in step S3222 is appropriate (S3224). Step S3224 is the same as step S3110 of FIG. 12.

If it is determined that the command received in step S3222 is appropriate, the control unit 31 converts the command received in step S3222 into the format which can be interpreted by the control unit 11 of the first basic part 10-1, and transmits the converted command to the first basic part 10-1 with the ID "0000-0000" via the communication unit 33 (S3226). In this case, the command received in step S3222 is converted into a command of the intermediate code (the byte code), and the converted command is transmitted to the first basic part 10-1 with the ID "0000-0000".

The first basic part 10-1 with the ID "0000-0000" receives the command transmitted from the server 30 via the communication unit 13 (S1204). In this case, the control unit 11 of the first basic part 10-1 performs control in accordance with the received command (S1206). For example, the control unit 11 stores data in the storage unit 12. The data indicates, with respect to each of the terminals 17-10 and 17-11 to which the anode 71 and the cathode 72 of the LED 70 are connected, by which control mode among the control modes shown in FIG. 4A to FIG. 4D the terminal 17 should be controlled.

After that, a sixteenth line portion of the program shown in FIG. 14 is executed. In the sixteenth line portion, it is specified that a type of the electronic component connected to the second basic part 10-2 with the ID "1111-1111" is the servomotor 50, and it is also specified that the minus line (GND) 51, the plus line (VCC) 52, and the signal line 53 of the servomotor 50 are respectively connected to the terminals 17-0, 17-1, and 17-2.

As a result, of the execution of the sixteenth line portion, step S2212 shown in FIG. 15B is executed. That is, the control unit 21 of the user terminal 20 transmits, to the server 30, a specification command which specifies that the minus line (GND) 51, the plus line (VCC) 52, and the signal line 53 of the servomotor 50 are respectively connected to the terminals 17-0, 17-1, and 17-2 of the second basic part 10-2 with the ID "1111-1111" (S2212). In this case, with respect to each of the terminals 17-0, 17-1, and 17-2 to which the servomotor 50 is connected, it is determined based on the library by which control mode among the control modes shown in FIG. 4A to FIG. 4D the terminal 17 should be controlled, and a specification command which indicates the determination result is transmitted to the server 30.

The server 30 receives, via the communication unit 33, the specification command transmitted from the user terminal 20 (S3228). Then, the control unit 31 of the server 30 determines whether or not the command received in step S3228 is appropriate (S3230). Step S3230 is the same as step S3110 of FIG. 12.

If it is determined that the command received in step S3228 is appropriate, the control unit 31 converts the command received in step S3228 into the format which can be interpreted by the control unit 11 of the second basic part 10-2, and transmits, via the communication unit 33, the converted command to the second basic part 10-2 with the ID "1111-1111" (S3232). In this case, the command received in step S3228 is converted into a command of the intermediate code (the byte code), and the converted command is transmitted to the second basic part 10-2 with the ID "1111-1111".

The second basic part 10-2 with the ID "1111-1111" receives, via the communication unit 13, the command transmitted from the server 30 (S1300). In this case, the control unit 11 of the second basic part 10-2 performs control in accordance with the received command (S1302). For example, the control unit 11 stores data in the storage unit 12. The data indicates, with respect to each of the terminals 17-0, 17-1, and 17-2 to which the minus line (GND) 51, the plus line (VCC) 52, and the signal line 53 of the servomotor 50 are connected, by which control mode among the control modes shown in FIG. 4A to FIG. 4D the terminal 17 should be controlled. In this case, the second processor 11B performs the control as shown in FIG. 4B with respect to each the input/output units 18-0, 18-1, and 18-2 of the terminals 17-0, 17-1, and 17-2. Further, the first processor 11A outputs a signal of 0V to the terminal 17-0 to which the minus line (GND) 51 is connected and outputs a signal of 5V to the terminal 17-1 to which the plus line (VCC) 52 is connected, via the input/output units 18-0 and 18-1 (motor drivers 18A-0 and 18A-1).

After the processing as described above have been executed, as shown in FIG. 15C, the control unit 11 of the first basic part 10-1 notifies the server 30 of a position of the knob 64 of the volume 60 via the communication unit 13 (S1208). As has been described above, based on an input from the volume 60, a numerical value between "0" and "1" is acquired as the numerical value which indicates the position of the knob 64, and the numerical value is notified to the server 30. The notification is periodically made again and again.

The server 30 receives the notification transmitted from the first basic part 10-1 via the communication unit 13 (S3234). In this case, the server 30 transmits, to the user terminal 20 via the communication unit 33, the notification as described above in a format which can be interpreted by the control unit 21 of the user terminal 20 (S3236).

The user terminal 20 receives, via the communication unit 23, the notification transmitted from the server 30 (S2214). In this case, the control unit 21 of the user terminal 20 determines whether or not the position of the knob 64 of the volume 60 has changed (S2216). That is, the control unit 21 determines whether or not the numerical value notified at a previous time differs from the numerical value notified this time. If the position of the knob 64 of the volume 60 is changed, an eighteenth to twenty-third lines portion of the program shown in FIG. 14 is executed. The program shown in FIG. 14 is configured that the notification transmitted from the server 30 (the numerical value indicating the position of the knob 64 of the volume 60) is stored in a variable "position". Further, if the position of the knob 64 of the volume 60 is not changed, the eighteenth to twenty-third lines portion of the program shown in FIG. 14 is not executed, and thus processing to be described below is not executed either.

The eighteenth to twenty-second lines portion corresponds to processing for turning on the LED 70 connected to the first basic part 10-1 if the numerical value indicating the position of the knob 64 of the volume 60 is more than 0.5, and turning off the LED 70 connected to the first basic part 10-1 if the numerical value indicating the position of the knob 64 of the volume 60 is not more than 0.5. As a result of execution of the eighteenth to twenty-second lines portion, step S2218 in FIG. 15C is executed. That is, the control unit 21 of the user terminal 20 transmits, to the server 30 via the communication unit 23, a command to turn on the LED 70 connected to the terminals 17-10 and 17-11 of the first basic part 10-1 with the ID "0000-0000" if the above numerical value is more than 0.5, and transmits, to the server 30 via the communication unit 23, a command to turn off the LED 70 connected to the terminals 17-10 and 17-11 of the first basic part 10-1 with the ID "0000-0000" if the above numerical value is not more than 0.5 (S2218).

The server 30 receives, via the communication unit 33, the command transmitted from the user terminal 20 (S3238).

Then, the control unit 31 of the server 30 determines whether or not the command received in step S3238 is appropriate (S3240). Step S3240 is the same as the step S3110 of FIG. 12.

If it is determined that the command received in step S3238 is appropriate, the control unit 31 converts the command received in step S3238 into the format which can be interpreted by the control unit 11 of the first basic part 10-1, and transmits the converted command to the first basic part 10-1 with the ID "0000-0000" via the communication unit 33 (S3242). In this case, the command received in step S3238 is converted into a command of the intermediate code (the byte code), and the converted command is transmitted to the first basic part 10-1 with the ID "0000-0000".

The first basic part 10-1 with the ID "0000-0000" receives, via the communication unit 13, the Command transmitted from the server 30 (S1210). In this case, the control unit 11 of the first basic part 10-1 performs control of the LED 70 in accordance with the received command (S1212). That is, the control unit 11 turns on/off the LED 70 connected to the terminals 17-10 and 17-11 in accordance with the received command. In the case where the LED is turned on, the second processor 11B performs the control as shown in FIG. 4A with respect to the input/output units 18-10 and 18-11 of the terminals 17-10 and 17-11, and the first processor 11A outputs, to the terminal 17-10, a signal of 3V to have the LED 70 emit light, and outputs a signal of 0V to the terminal 17-11.

Further, the twenty-third line portion of the program shown in FIG. 14 corresponds to processing for rotating the servomotor 50 connected to the terminals 17-0, 17-1, and 17-2 of the second basic part 10-2 by the angle corresponding to the position of the knob 64 of the volume 60 connected to the first basic part 10-1. In the example shown in FIG. 14, it is configured that the servomotor 50 is rotated by the angle obtained by multiplying the numerical value (0 to 1) indicating the position of the knob 64 of the volume 60 by 180 degrees. As a result of execution of the twenty-third line portion, step S2220 of FIG. 15C is executed. That is, the control unit 21 of the user terminal 20 transmits, to the server 30, a command to rotate the servomotor 50 connected to the terminals 17-0, 17-1, and 17-2 of the second basic part 10-2 with the ID "1111-1111" by the angle corresponding to the position of the knob 64 of the volume 60 connected to the first basic part 10-1 (S2220).

The server 30 receives, via the communication unit 33, the command transmitted from the user terminal 20 (S3244). Then, the control unit 31 of the server 30 determines whether or not the command received in step S3244 is appropriate (S3246). Step S3246 is the same as step S3110 of FIG. 12.

If it is determined that the command received in step S3244 is appropriate, the control unit 31 converts the command received in step S3244 into the format which can be interpreted by the control unit 11 of the second basic part 10-2, and transmits the converted command to the second basic part 10-2 with the ID "1111-1111" via the communication unit 33 (S3248). In this case, the command received in step S3244 is converted into a command of the intermediate code (the byte code), and the converted command is transmitted to the second basic part 10-2 with the ID "1111-1111".

The second basic part 10-2 with the ID "1111-1111" receives, via the communication unit 13, the command transmitted from the server 30 (S1304). In this case, the control unit 11 of the second basic part 10-2 performs control of the servomotor 50 in accordance with the received command (S3106). That is, the control unit 11 rotates the servomotor 50 connected to the terminals 17-0, 17-1, and 17-2 in accordance with the received command. In this case, the second processor 11B performs the control as shown in FIG. 4B with respect to the input/output units 18-0, 18-1, and 18-2 of the terminals 17-0, 17-1, and 17-2, and the first processor 11A outputs signals of 0V and 5V as signals to drive the servomotor 50 to the terminals 17-0 and 17-1 via the motor drivers 18A-0 and 18A-1 respectively, and outputs a signal to rotate the servomotor 50 by the angle specified by the command to the terminal 17-2 via the motor driver 18A-2.

As has been described above, in the control system 1 according to the present embodiment, a system can be realized where in accordance with the user's operation with respect to the volume 60 connected to the first basic part 10-1, the LED 70 connected to the first basic part 10-1 can be turned on/off, and the servomotor 50 connected to the second basic part 10-2 can be rotated.

That is, a system can be realized where an operation performed with respect to an electronic component connected to the first basic part 10-1 can be reflected on another electronic component connected to the first basic part 10-1. Further, a system also can be realized where an operation with respect to an electronic component connected to the first basic part 10-1 can be reflected on an electronic component connected to the second basic part 10-2. For example, the first basic part 10-1 can be made to function as a controller of the second basic part 10-2. Specifically, for example, it is possible to create a robot or the like by connecting a plurality of electronic components to the second basic part 10-2 and create a controller to operate the robot or the like by the first basic part 10-1.

Although in the example which has been described above, the volume 60 is chosen as an example of an electronic component to accept (receive) the user's operation, an electronic component other than the volume 60 can be used as well. For example, an electronic component such as button can be used.

Further, instead of an electronic component which accepts a user's operation, a sensor may be connected to the first basic part 10-1. For example, it may be configured a detection result of the sensor is input from the terminal 17, the control unit 11 of the first basic part 10-1 notifies the server 30 of the sensor's detection result, the server 30 transmits the notification to the user terminal 20, and the control unit 21 of the user terminal 20 transmits, to the server 30, a command to rotate the servomotor 50 or turn on the LED 70, based on the detection result of the sensor. Specifically, for example, it may be configured to connect the temperature sensor to the first basic part 10-1, and connect, the LED 70 to the second basic part 10-2, and may be configured that the control unit 21 of the user terminal 20 turns on the LED 70 when the temperature detected by the temperature sensor is equal to or more than (or equal to or less than) the threshold value. In this case, the first basic part 10-1 and the second basic part 10-2 may be located in different places. According to such a configuration, the temperature of the location of the first basic part 10-1 can be monitored using the second basic part 10-2 from a distant location.

Further, an operation with respect to the volume, button, or the like connected to the basic part 10, and the detection result of the sensor connected to the basic part 10 can be reflected on a screen displayed on the display unit 26 of the user terminal 20. That is, it may be configured that a display content of the screen displayed on the display unit 26 of the user terminal 20 is updated based on an operation with respect to the volume, the button, or the like connected to the basic part 10 and a detection result of the sensor connected to the basic part 10.

[6. Functional Blocks] Functional blocks implemented in the control system 1 which has been described above are shown in FIG. 16.

Figure 16:
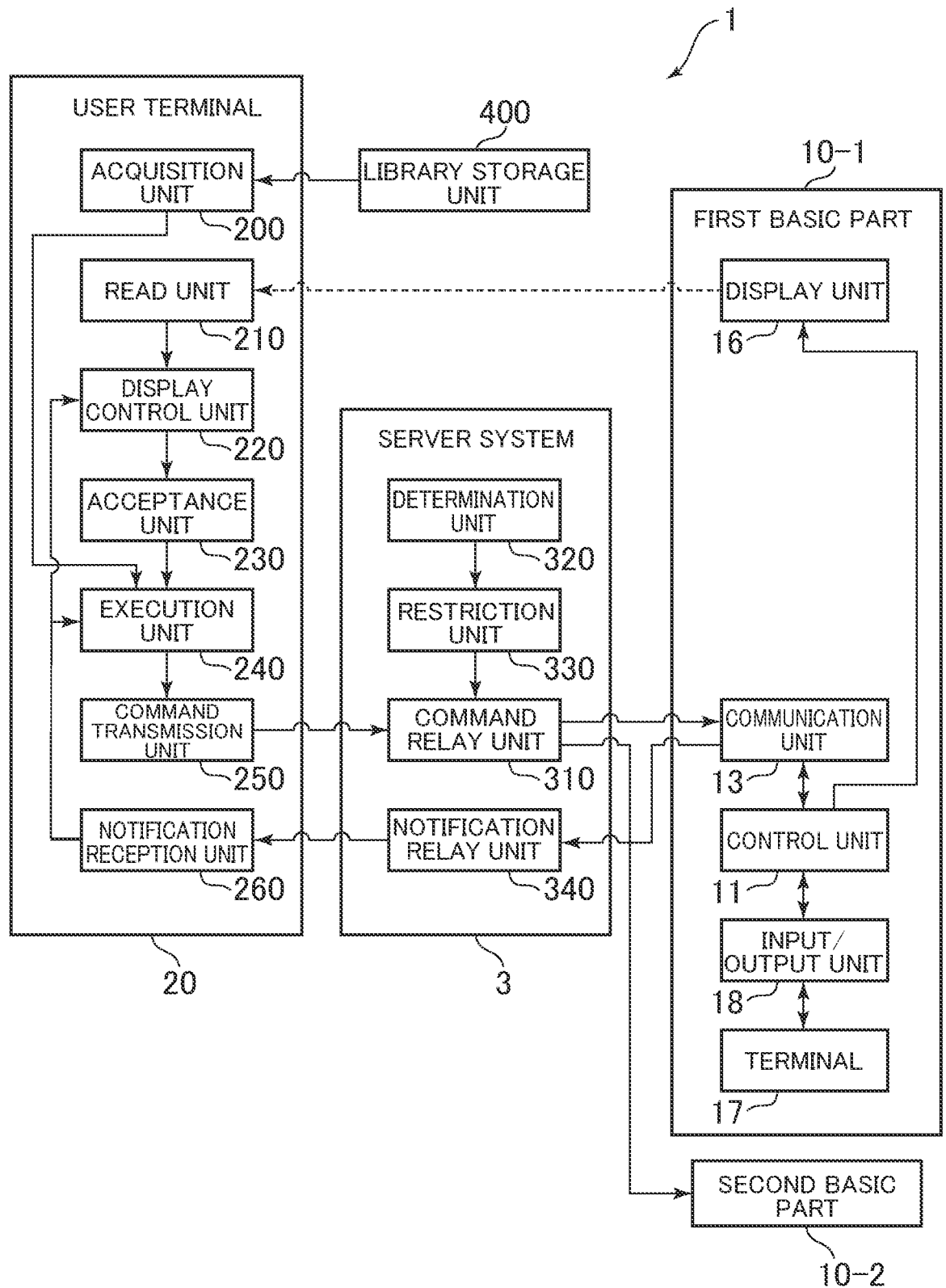
FIG. 16 is a diagram which shows functional blocks implemented in the control system.

As shown in FIG. 16, the user terminal 20 includes an acquisition unit 200, a read unit 210, a display control unit 220, an acceptance unit 230, an execution unit 240, a command transmission unit 250, and a notification reception unit 260. Those functional blocks are implemented mainly by the control unit 21 of the user terminal 20. That is, the control unit 21 executes processing (see FIG. 12, and FIG. 15A to FIG. 15C) according to the program (see FIG. 9, FIG. 14 and the like) to thereby function as those functional blocks.

Further, as shown in FIG. 16, the server system 3 (the server 30) includes a command relay unit 310, a determination unit 320, a restriction unit 330, and a notification relay unit 340. Those functional blocks are implemented mainly by the control unit 31 of the server 30. That is, the control unit 31 executes processing (see FIG. 12, and FIG. 15A to FIG. 15C) according to the program to thereby function as those functional blocks.

Further, as shown in FIG. 16, the control system 1 includes a library storage unit 400. The library storage unit 400 is implemented by the library providing server 40.

[6-1] The library storage unit 400 stores a library of an API (application programming interface) to have the control unit 11 perform control with respect to an electronic component connected to the terminal 17 of the basic part 10 (electronic component control). The acquisition unit 200 of the user terminal 200 acquires the library stored in the library storage unit 400 via the network N.

[6-2] The control unit 11 of the basic part 10 (the first basic part 10-1) displays, on the display unit 16 of the basic part 10, information for displaying, on the display terminal 20, the program editing screen for editing a program to have the control unit 11 of the basic part 10 perform the electronic component control. The read unit 210 of the user terminal 20 reads the information displayed on the display unit 16 of the basic part 10. The display control unit 220 of the user terminal 20 displays the program editing screen on the display unit 26 of the user terminal 20, based on the information read by the read unit 210.

For example, the control unit 11 of the basic part 10 displays the information screen G100 (see FIG. 7) on the display unit 16. The read unit 210 of the user terminal 20 reads the QR code (the display component E103) in the information screen G100. The display control unit 220 of the user terminal 20 extracts the ID of the basic part 10 and the URL of the program editing screen G200 from the QR code read by the read unit 210, and displays the program editing screen G200 (see FIG. 9 and FIG. 14) on the display unit 26, based on the extracted ID and the extracted URL.

[6-3] The acceptance unit 230 of the user terminal 20 accepts an input of the program to have the control unit 11 of the basic part 10 perform the electronic component control by using the library to be stored in the library storage unit 400. For example, the acceptance unit 230 accepts an input of the program via the program editing screen G200 (the editing region A204). The execution unit 240 of the user terminal 20 executes the program based on the library acquired by the acquisition unit 200.

[6-4] The command transmission unit 250 of the user terminal 20 transmits, to the server system 3, a command to have the control unit 11 of the basic part 10 (the first basic part 10-1 or the like) perform the electronic component control in accordance with the execution of the program.

The command relay unit 310 of the server system 3 receives the command transmitted from the user terminal 20, and transmits a command based on the received command to the basic part 10 (the first basic part 10-1 or the like). For example, the command relay unit 310 converts the command received from the user terminal 20 into a command which can be interpreted by the control unit 11 of the basic part 10, and transmit the converted command to the basic part 10. Specifically, for example, the command relay unit 310 converts the command received from the user terminal 20 into a command of the byte code, and then transmits it to the basic part 10. If the format of the command received from the user terminal 20 is a format which can be interpreted by the control unit 11 of the basic part 10, the command relay unit 210 may transmit, to the basic part 10, the command received from the user terminal 20 as it is without converting it into another format.

The command transmission unit 250 of the user terminal 20 transmits commands one by one to the server system 3, and the command relay unit 310 transmits, to the basic part 10, commands based on the commands received from the user terminal 20 one by one. One command is transmitted with a single packet.

The communication unit 13 of the basic part 10 (the first basic part 10-1) receives the command transmitted from the server system 3 (the command relay unit 310), and the control unit 11 of the basic part 10 (the first basic part 10-1) performs the electronic component control based on the command received via the communication unit 13.

For example, the command transmission unit 250 of the user terminal 20 transmits, to the server system 3, a specification command which specifies a type of the electronic component and the terminal 17 to which the electronic component is connected. The command relay unit 310 of the server system 3 receives the specification command transmitted from the user terminal 20, and transmits a specification command based on the received specification command to the basic part 10 (the first basic part 10-1). Based on the received specification command, the control unit 11 of the basic part 10 identifies the terminal 17 to which the electronic component is connected from among the plurality of the terminals 17 and identifies the type of the electronic component connected to the terminal 17. Then, in accordance with the command that is with respect to the electronic component of the identified type and that is received thereafter, the control unit 11 performs control of the electronic component with respect to the identified terminal 17.

[6-5] The determination unit 320 of the server system 3 determines whether or not the command received from the user terminal 20 is appropriate, based on the predetermined determination standard. Based on the determination result of the determination unit 320, the restriction unit 330 of the server system 3 restricts transmission of a command to the basic part 10 by the command relay unit 310. For example, if the command received from the user terminal 20 is inappropriate, the restriction unit 330 restricts (suppresses) transmission of a command to the basic part 10 by the command relay unit 310. Meanwhile, if the command received from the user terminal 20 is appropriate, the restriction unit 330 does not restrict transmission of a command to the basic part 10 by the command relay unit 310, but allows it.

[6-6] If an electronic component which accepts an operation or an electronic component which is a sensor is connected to the terminal 17, the control unit 11 of the basic part 10 transmits a notification indicating an acceptance result of the operation or a detection result of the sensor to the server system 3 via the communication unit 13. For example, the volume 60, a button, or the like corresponds to an example of the "electronic component which accepts an operation". Further, for example, an acceleration sensor, a temperature sensor, or the like corresponds to an example of the "electronic component which is a sensor".

The notification relay unit 340 of the server system 3 receives the notification transmitted from the basic part 10, and transmits a notification based on the received notification to the user terminal 20. For example, in the case where the format of the notification received from the basic part 10 is not a format which can be interpreted by the user terminal 20, the notification relay unit 340 converts the notification received from the basic part 10 into the notification of the format which can be interpreted by the user terminal 20, and transmits the converted notification to the user terminal 20. Meanwhile, in the case where the format of the notification received from the basic part 10 is the format which can be interpreted by the user terminal 20, the notification relay unit 340 transmits, to the user terminal 20, the notification received from the basic part 10 as it is without converting it into that of another format.

The notification reception unit 260 of the user terminal 20 receives the notification transmitted from the server system 3 (the notification relay unit 340). The command transmission unit 250 of the user terminal 20 transmits a command in accordance with the notification received by the notification reception unit 260 to the server system 3.

For example, the notification reception unit 260 receives the notification transmitted from the first basic part 10-1 and relayed by the notification relay unit 340 of the server system 3, and the command transmission unit 250 transmits, to the server system 3, a command to have the control unit 11 of the first basic part 10-1 perform the electronic component control, in accordance with the received notification.

Further, for example, the notification reception unit 260 receives the notification transmitted from the first basic part 10-1 and relayed by the notification relay unit 340 of the server system 3, the execution unit 240 executes, in accordance with the received notification, processing (a program) to have the control unit 11 of the second basic part 10-2 different from the first basic part 10-1 perform the electronic component control, and the command transmission unit 250 transmits, to the server system 3, a command to have the control unit 11 of the second basic part 10-2 different from the first basic part 10-1 perform the electronic component control. In this case, the command relay unit 310 of the server system 3 transmits a command based on the received command to the second basic part 10-2. The display control unit 220 may update a display content of the display unit 26 based on the notification received by the notification reception unit 260.

[7. Effect/Variation] According to the control system 1 which has been described above, by executing, on the user terminal 20, a program edited on the user terminal 20, the control with respect to the electronic component connected to the terminal 17 of the basic part 10 can be performed. Since it is not necessary to write the program to be executed by the control unit 11 of the basic part 10 into the storage unit 12 on the basic part 10, it can be easily for the user to execute the program to perform control with respect to the electronic component connected to the terminal 17 of the basic part 10.

Further, according to the control system 1, since it is configured to execute the program on the user terminal 20, and transmit the commands of the intermediate code one by one sequentially to the basic part 10, as compared to the case to write the program into the storage unit 12 of the basic part 10, the memory amount which is required on the basic part 10 can be reduced and the communication amount can be reduced as well. Further, in the case to write the program into the storage unit 12 of the basic part 10, it takes time to write the program into the storage unit 12 of the basic part 10, but according to the control system 1, the program can be immediately executed. Further, according to the control system 1, since the program is executed on the user terminal 20, even the program with a size too large to be stored in the storage unit 12 of the basic part 10 can be executed.

Further, according to the control system 1, since it is possible to execute the program from the web browser of the user terminal 20, it is not necessary to prepare a particular programming environment separately. Even on a smartphone or a tablet computer, a creation and execution of the program can be performed. According to the control system 1, a full-time connection to the server 30 even from the user terminals 20 with a different domain can be made by WebSocket, and the basic part 10 can be controlled from the web browser of the user terminal 20 via the server 30. Since it is the full-time connection, when the button displayed on the display unit 26 of the user terminal 20 is pressed, the servomotor 50 connected to the basic part 10 can be rotated immediately, or the LED 70 connected to the basic part 10 can be lighted immediately.

Further, according to the control system 1, since it is possible to execute the program from the web browser of the user terminal 20, it is possible to execute the same program on the plurality of user terminals 20 simultaneously. That is, it becomes easier to divide processing with a load too large to be processed by a single user terminal 20, and leave the divided processings to the plurality of user terminals 20.

Further, according to the control system 1, since the program is executed from the web browser of the user terminal 20, even when the program which the user created has a problem, it is often the case that the problem occurs only on the web browser of the user terminal 20, and the server 30 and the basic part 10 are hardly influenced by that problem.

Further, according to the control system 1, since the program is executed on the user terminal 20, the program can be partially executed. For example, the program can be executed on the user terminal 20 on a line-by-line basis, and in the case where a problem occurs while executing the program, the program whose problematic part has been corrected can be executed again, starting from the middle. That is, the program can be corrected while it is being executed. In the case where the program is written into the storage unit 12 of the basic part 10, if there is a problem in the program, connection to the basic part 10 might be interrupted. However, according to the control system 1, a generation of such an event can be prevented.

Further, according to the control system 1, by using a library, the user can create a program even if the user does not have a detailed knowledge about WebSocket or the electronic component control. Further, since it is configured to provide the library by the common library providing server 40 which is accessed by the plurality of user terminals 20, even when a revision is applied to the library, nothing more than to revise the library stored in the library providing server 40 is required.

Further, according to the control system 1, since the program is executed from the web browser of the user terminal 20, it is possible to use various types of libraries which already exist and can be used on the web browser. There are many libraries which can be used on the web browser, such libraries can be used actually. For example, by using a library to write data into an online storage, it becomes relatively easy to store the detection result of the sensor connected to the terminal 17 of the basic part 10 into the online storage, using the web browser of the user terminal 20.

Further, according to the control system 1, the program editing screen G200 to edit a program to control the basic part 10 can be displayed on the display unit 26 of the user terminal 20, and a creation of the program can be performed immediately, only by having the user terminal 20 read the information (FIG. 7: the display component E103 (the QR code) or the like) displayed on the display unit 16 of the basic part 10.

Further, according to the control system 1, since it is configured to generate the information (FIG. 7: the display components E102 and E103) displayed on the display unit 16 of the basic part 10 on the server 30 (FIG. 6: step S3010), the information as described above can be changed in accordance with the basic part 10. For example, depending on the location of the basic part 10, the URL which is displayed on the display unit 16 of the basic part 10 as the display component E102 (the URL embedded to the display component E103 (the QR code) displayed on the display unit 16 of the basic part 10) can be changed. Specifically, for example, in the case where the basic part 10 is located in Japan, the URL can be a URL of the server 30 in Japan, and in the case where the basic part 10 is located in the US, the URL can a URL of the server 30 in the US. By the configuration as this, a delay in communication can be reduced.

Further, according to the control system 1, since data is transmitted/received between the user terminal 20 and the basic part 10 via the server 30, the user terminal 20 and the basic part 10 can transmit/receive data even without knowing each other's IP address. Moreover, according to the control system 1, since data is transmitted/received between the user terminal 20 and the basic part 10 via the server 30, by accumulating the data in the server 30, even when the communication-connection of one of the user terminal 20 and the basic part 10 is temporarily disconnected, if the communication-connection is restored, the processing can be executed from the point before the disconnection continuously.

Further, according to the control system 1, since a command is transmitted from the user terminal 20 to the basic part 10 via the server 30, the server 30 confirms whether or not the command is appropriate, and therefore an inappropriate command can be prevented from being transmitted to the basic part 10. Further, in the case where the command is inappropriate, by sending a caution to the user terminal 20, it is possible to prompt the user to correct the program. Moreover, it may be configured that examples of inappropriate commands are accumulated in the server system 3, and information based on the accumulation result can be provided to each user.

Further, according to the control system 1, the plurality of basic parts 10 can be controlled by one program (one user terminal 20).

Further, according to the control system 1, the user can connect various types of electronic components to an arbitrary terminal 17. For example, in the control system 1, as a result of performing the controls shown in FIG. 4A to FIG. 4D, the user can connect the electronic component to an arbitrary terminal 17 without worrying about an amount of a voltage/current which the electronic component requires or an input/output of the electronic component.

Further, according to the control system 1, since the basic part 10 includes two processors (the first processor 11A and the second processor 11B) and those two processors performs monitoring and control as shown in FIG. 5A to FIG. 5B, it is possible to immediately dealt with the problem when the problem occurs.

Note that the present invention is not limited to the embodiments which have been described above. For example, three or more basic parts 10 may work in corporation. Further, for example, it may be configured that a plurality of programs (the plurality of user terminals 20) control one or more basic parts 10. Specifically, for example, it may be configured that when a button connected to one basic part 10 is pressed, the plurality of user terminals 20 are notified as such, and the plurality of user terminals 20 are made to execute processing in accordance with the pressing of the button.

[8. Supplementary Note] From the descriptions as above, the present invention is understood, for example, as below.

1) A control system according to one aspect of the present invention includes: a basic part to which one or more electronic components can be connected, the basic part including: a terminal to which an electronic component can be connected; a communication unit; and a control unit which performs electronic component control with respect to the electronic component connected to the terminal; a server system; a user terminal; and a library storage means which is accessed from a plurality of user terminals in common and stores a library of an API (an application programming interface) to have the control unit of the basic part perform the electronic component control. The user terminal includes: an acquisition means which acquires a library stored in the library storage means; an acceptance means which accepts an input of a program to have the control unit of the basic part perform the electronic component control using the library; an execution means which executes the program based on the library; and the command transmission means which transmits, to the server system, a command to have the control unit of the basic part perform the electronic component control in accordance with execution of the program, the server system includes a command relay means which receives the command transmitted from the user terminal, and transmits a command based on the received command to the basic part, the communication unit of the basic part receives the command transmitted from the server system, and the control unit of the basic part performs the electronic component control based on the command received by the communication unit.

14) A control method according to one aspect of the present invention to control a basic part to which one or more electronic components can be connected, the basic part including: a terminal to which an electronic component can be connected; a communication unit; and a control unit which executes electronic component control with respect to the electronic component connected to the terminal, the method includes: a step where a user terminal acquires a library of an API (an application programming interface) to have the control unit of the basic part perform the electronic component control, the library being stored in a library storage means which is accessed from a plurality of user terminals in common; a step where the user terminal accepts an edition of a program to have the control unit of the basic part perform the electronic component control using the library; a step where the user terminal executes the program based on the library; a step where the user terminal transmits, to a server system, a command to have the control unit of the basic part perform the electronic component control in response to execution of the program; a step where the server system receives the command transmitted from the user terminal, and transmits a command based on the received command to the basic part; a step where the communication unit of the basic part receives the command transmitted from the server system; and a step where the control unit of the basic part performs the electronic component control based on the command received by the communication unit.

15) A basic part according to one aspect of the present invention includes: a terminal to which an electronic component can be connected; a control unit which performs control with respect to the electronic component connected to the terminal; and a communication unit to communicate with a server system. The communication unit receives a command transmitted from the server system, the command being based on a command transmitted from a user terminal to the server system in accordance with execution of a program edited on the user terminal, and the control unit performs control with respect to the electronic component connected to the terminal based on the command received by the communication unit.

2) In one aspect of the present invention, in a case where an electronic component which accepts operation or an electronic component which is a sensor is connected to the terminal, the control unit of the basic part may transmit, to the server system via the communication unit, an notification indicating an acceptance result of the operation or a detection result of the sensor, the server system may further include a notification relay means which receives the notification transmitted from the basic part, and transmits a notification based on the received notification to the user terminal, the user terminal may further include a notification reception means which receives the notification transmitted from the server system, and in a case where the notification is received by the notification reception means, the command transmission means of the user terminal may transmit a command in accordance with the received notification to the server system.

3) In one aspect of the present invention, in a case where the notification is received by the notification reception means, the command transmission means of the user terminal may transmit, to the server system, a command to have the control unit of the basic part perform the electronic component control in accordance with the received notification.

4) In one aspect or the present invention, the control system may further includes a first basic part and a second basic part, in a case where the electronic component which accepts the operation or the electronic component which is the sensor is connected to the terminal of the first basic part, the control unit of the first basic part may transmit, to the server system via the communication unit, a notification indicating an acceptance result of the operation or a detection result of the sensor, the notification relay means of the server system may receive the notification transmitted from the first basic part, and transmit a notification based on the received notification to the user terminal, in a case where the notification is received by the notification reception means, the command transmission means of the user terminal may transmit, to the server system, a command to have the control unit of the second basic part perform the electronic component control in accordance with the received notification, the command relay means of the server system may receive the command to have the control unit of the second basic part perform the electronic component control in accordance with the notification, and transmit a command based on the received command to the second basic part, the communication unit of the second basic part may receive a command transmitted from the server system, and the control unit of the second basic part received perform the electronic component control in accordance with the notification, based on the command received by the communication unit.

5) In one aspect of the present invention, the basic part may have a plurality of terminals to which the electronic component can be connected, the program may include a portion which specifies a type of the electronic component and a terminal to which the electronic component is connected from among the plurality of terminals, the command transmission means of the user terminal may transmit, to the server system, a specification command which specifies the type of the electronic component and the terminal to which the electronic component is connected, the command relay means of the server system may receive the specification command transmitted from the user terminal and transmit a specification command based on the received specification command to the basic part, the communication unit of the basic part may receive the specification command transmitted from the server system, and the control unit of the basic part may identify the terminal to which the electronic component is connected from among the plurality of terminals and the type of the electronic component connected to the terminal based on the specification command received by the communication unit, and perform electronic component control as to the electronic component with respect to the identified terminal, based on a command with respect to the electronic component which is received via the communication unit thereafter.

6) In one aspect of the present invention, the basic part may include a display unit, and the control unit of the basic part may display, on the display unit, information for having the user terminal display a program editing screen to edit the program, the user terminal may further include: a read means to read information displayed on the display unit; and a display control means to display the program editing screen on a display unit of the user terminal based on the information read by the read means, and the acceptance means of the user terminal may accept the input of the program via the program editing screen.

7) In one aspect of the present invention, the server system may further include: a determination means which determines whether or not the command transmitted from the user terminal is appropriate, based on a predetermined determination standard; and a restriction means which restricts transmission of the command to the basic part by the command relay means, based on a determination result of the determination means.

8) In one aspect of the present invention, on the basic part, a motor driver and a bus switch may be connected to the respective terminals, the control unit of the basic part may control the electronic component connected to the terminal via one of the motor driver and the bus switch which is selected based on a type of the electronic component connected to the terminal.

9) In one aspect of the present invention, in a case where an electric voltage or an electric current necessary to have the electronic component connected to the terminal operate is less than a predetermined standard, the control unit of the basic part may control the electronic component connected to the terminal via the bus switch connected to the terminal, and in a case where the electric voltage or the electric current necessary to have the electronic component connected to the terminal operate is equal to or more than the predetermined standard, the control unit of the basic part may control the electronic component connected to the terminal via the motor driver connected to the terminal.

10) In one aspect of the present invention, the control unit of the basic part may include a first processor and a second processor, the first processor may perform control with respect to the electronic component connected to the terminal, the second processor may monitor a state of the terminal, and provide the first processor with a result of the monitoring, and the first processor may perform control in accordance with the result of the monitoring provided from the second processor.

11) In one aspect of the present invention, the second processor may monitor a state of the first processor, and in a case where the first processor is in a malfunction state, the second processor may restrict control with respect to the electronic component connected to the terminal by the first processor.

12) In one aspect of the present invention, the command relay means of the server system may convert the command received from the user terminal into a command of a byte code, and transmit it to the basic part.

13) In one aspect of the present invention, the control unit of the basic part may transmit a request for a communication-connection to the server system via the communication unit, and in response to the request for the communication-connection, a communication-connection may be established between the basic part and the server system, and the basic part may be in a state to be able to receive the command from the server system via the communication unit.

What is claimed is:

1. A control system comprising:
  a basic part to which one or more electronic components can be connected, the basic part comprising:
    a connection terminal to which an electronic component can be connected; a communication unit; and
    a control unit which performs electronic component control with respect to the electronic component connected to the connection terminal;
  a server system; a user terminal; and
  a library storage which is accessed from a plurality of user terminals in common and stores a library of an application programming interface (API) to have the control unit of the basic part perform the electronic component control,
  wherein the user terminal is configured to:
    acquire a library stored in the library storage;
    accept an input of a program edited by a user to have the control unit of the basic part perform the electronic component control using the library;
    execute the program based on the library; and
    transmit, to the server system, a command to have the control unit of the basic part perform the electronic component control issued as an output of the execution of the program,
  the server system is configured to receive the command transmitted from the user terminal, and transmit a command based on the received command to the basic part,
  the communication unit of the basic part receives the command transmitted from the server system, and the control unit of the basic part performs the electronic component control in response to the command received by the communication unit.

2. The control system according to claim 1, wherein
in a case where an electronic component which accepts operation or an electronic component which is a sensor is connected to the connection terminal, the control unit of the basic part transmits, to the server system via the communication unit, a notification indicating an acceptance result of the operation or a detection result of the sensor,
the server system is configured to receive the notification transmitted from the basic part, and transmit a notification based on the received notification to the user terminal,
the user terminal is configured to:
receive the notification transmitted from the server system; and
transmit, in a case where the notification is received by the user terminal, a command based on the received notification to the server system.

3. The control system according to claim 2, wherein
in a case where the notification is received by the user terminal, the user terminal transmits, to the server system, a command to have the control unit of the basic part perform the electronic component control in accordance with the received notification.

4. The control system according to claim 2, further comprising a first basic part and a second basic part, wherein
in a case where the electronic component which accepts the operation or the electronic component which is the sensor is connected to the connection terminal of the first basic part, the control unit of the first basic part transmits, to the server system via the communication unit, a notification indicating an acceptance result of the operation or a detection result of the sensor,
the server system receives the notification transmitted from the first basic part, and transmits a notification based on the received notification to the user terminal,
in a case where the notification is received by the user terminal, the user terminal transmits, to the server system, a command to have the control unit of the second basic part perform the electronic component control in accordance with the received notification,
the server system receives the command to have the control unit of the second basic part perform the electronic component control in accordance with the notification, and transmits a command based on the received command to the second basic part,
the communication unit of the second basic part receives a command transmitted from the server system, and
the control unit of the second basic part performs the electronic component control in accordance with the notification, based on the command received by the communication unit.

5. The control system according to claim 1, wherein
the basic part has a plurality of connection terminals to which the electronic component can be connected,
the program comprises a portion which specifies a type of the electronic component and connection terminal to which the electronic component is connected from among the plurality of connection terminals,
the user terminal transmits, to the server system, a specification command which specifies the type of the electronic component and the connection terminal to which the electronic component is connected, the server system receives the specification command transmitted from the user terminal and transmits a specification command based on the received specification command to the basic part,
the communication unit of the basic part receives the specification command transmitted from the server system, and
the control unit of the basic part identifies the connection terminal to which the electronic component is connected from among the plurality of connection terminals and the type of the electronic component connected to the connection terminal based on the specification command received by the communication unit, and performs electronic component control as to the electronic component with respect to the identified connection terminal, based on a command with respect to the electronic component which is received via the communication unit thereafter.

6. The control system according to claim 1, wherein
the basic part comprises a display unit,
the control unit of the basic part displays, on the display unit, information for having the user terminal display a program editing screen to edit the program, and
the user terminal is further configured to:
read information displayed on the display unit;
display the program editing screen on a display unit of the user terminal based on the read information; and
accept the input of the program via the program editing screen.

7. The control system according to claim 1, wherein
the server system is further configured to:
determine whether or not the command transmitted from the user terminal is appropriate, based on a predetermined determination standard; and
restrict transmission of the command to the basic part, based on a determination result of whether or not the command is appropriate.

8. The control system according to claim 1, wherein
on the basic part, a motor driver and a bus switch are connected to the respective connection terminals,
the control unit of the basic part controls the electronic component connected to the connection terminal via one of the motor driver and the bus switch which is selected based on a type of the electronic component connected to the connection terminal.

9. The control system according to claim 8, wherein
in a case where an electric voltage or an electric current necessary to have the electronic component connected to the connection terminal operate is less than a predetermined standard, the control unit of the basic part controls the electronic component connected to the connection terminal via the bus switch connected to the connection terminal, and
in a case where the electric voltage or the electric current necessary to have the electronic component connected to the connection terminal operate is equal to or more than the predetermined standard, the control unit of the basic part controls the electronic component connected to the connection terminal via the motor driver connected to the connection terminal.

10. The control system according to claim 1, wherein
the control unit of the basic part comprises a first processor and a second processor,
the first processor performs control with respect to the electronic component connected to the connection terminal, the second processor monitors a state of the connection terminal, and provides the first processor with a result of the monitoring, and the first processor performs control in accordance with the result of the monitoring provided from the second processor.

11. The control system according to claim 10, wherein the second processor monitors a state of the first processor, and in a case where the first processor is in a malfunction state, the second processor restricts control with respect to the electronic component connected to the connection terminal by the first processor.

12. The control system according to claim 1, wherein the server system converts the command received from the user terminal into a command of a byte code, and transmits the command of the byte code to the basic part.

13. The control system according to claim 1, wherein the control unit of the basic part transmits a request for a communication-connection to the server system via the communication unit, and in response to the request for the communication-connection, a communication-connection is established between the basic part and the server system, and the basic part is in a state to be able to receive the command from the server system via the communication unit.

14. A control method to control a basic part to which one or more electronic components can be connected, the basic part comprising: a connection terminal to which an electronic component can be connected; a communication unit; and a control unit which executes electronic component control with respect to the electronic component connected to the connection terminal, the method comprising:

acquiring, by a user terminal, a library of an application programming interface (API) to have the control unit of the basic part perform the electronic component control, the library being stored in a library storage which is accessed from a plurality of user terminals in common;

accepting, by the user terminal, an edition of a program edited by a user to have the control unit of the basic part perform the electronic component control using the library; executing, by the user terminal, the program based on the library;

transmitting, by the user terminal, a command to have the control unit of the basic part perform the electronic component control to a server system issued as an output of the execution of the program;

receiving, by the server system, the command transmitted from the user terminal, and transmitting, by the server system, a command based on the received command to the basic part;

receiving, by the communication unit of the basic part, the command transmitted from the server system; and performing, by the control unit of the basic part, the electronic component control in response to the command received by the communication unit.

15. A basic part comprising:

a connection terminal to which an electronic component can be connected;

a control unit which performs control with respect to the electronic component connected to the connection terminal; and a communication unit to communicate with a server system, wherein the communication unit receives a command transmitted from the server system, the command being based on a command transmitted from a user terminal to the server system issued as an output of execution of a program, wherein the program is edited by a user on the user terminal based on an acquired library of an application programming interface (API), the library being stored in a library storage accessed by a plurality of user terminals in common; and the control unit performs control with respect to the electronic component connected to the connection terminal in response to the command received by the communication unit.

\* \* \* \* \*